United States Patent
Baumbach et al.

(10) Patent No.: US 12,491,357 B2
(45) Date of Patent: Dec. 9, 2025

(54) SYSTEMS AND METHODS FOR DETERMINING A BLOOD VOLUME FLOW THROUGH A CARDIAC SUPPORT SYSTEM AND VASCULAR SUPPORT SYSTEM

(71) Applicant: KARDION GMBH, Stuttgart (DE)

(72) Inventors: Hardy Baumbach, Stuttgart (DE); Julian Kassel, Böblingen (DE); Inga Schellenberg, Stuttgart (DE); Martina Budde, Karlsruhe (DE); Thomas Alexander Schlebusch, Renningen (DE)

(73) Assignee: KARDION GMBH, Stuttgart (DE)

( * ) Notice: Subject to any disclaimer, the term of this patent is extended or adjusted under 35 U.S.C. 154(b) by 1075 days.

(21) Appl. No.: 15/734,004

(22) PCT Filed: Jun. 6, 2019

(86) PCT No.: PCT/EP2019/064800
§ 371 (c)(1),
(2) Date: Jun. 9, 2021

(87) PCT Pub. No.: WO2019/234161
PCT Pub. Date: Dec. 12, 2019

(65) Prior Publication Data
US 2021/0346674 A1    Nov. 11, 2021

(30) Foreign Application Priority Data
Jun. 6, 2018 (DE) .......................... 102018208870.5

(51) Int. Cl.
*A61M 60/253* (2021.01)
*A61M 60/178* (2021.01)
(Continued)

(52) U.S. Cl.
CPC ........ *A61M 60/523* (2021.01); *A61M 60/178* (2021.01); *A61M 60/216* (2021.01);
(Continued)

(58) Field of Classification Search
CPC .............. A61M 60/523; A61M 60/531; A61M 60/148; A61M 60/237; A61M 60/81;
(Continued)

(56) References Cited

U.S. PATENT DOCUMENTS 3,088,323 A    5/1963    Welkowitz et al.
4,023,562 A    5/1977    Hynecek et al.
(Continued)

FOREIGN PATENT DOCUMENTS

CA    3 122 415    7/2020
CN    1192351 A    9/1998
(Continued)

OTHER PUBLICATIONS

Hertz Ph.D. et al, "Ultrasonic Engineering in Heart Diagnosis", The American Journal of Cardiology, Jan. 1967, vol. 19, No. 1, pp. 6-17.
(Continued)

*Primary Examiner* — Jon Eric C Morales
(74) *Attorney, Agent, or Firm* — Knobbe, Martens, Olson & Bear, LLP

(57) ABSTRACT

The invention relates to a method for determining a fluid volume flow (1) through an implanted vascular support system (2), comprising the following steps: a) determining a fluid temperature parameter in the region of a cannula (4) of the support system (2), b) operating a heating element (5) which can bring about a change in a fluid temperature in the cannula (4), c) determining the fluid volume flow (1) using at least the fluid temperature parameter or the change thereof
(Continued)

and at least one heating element operating parameter or the change thereof. The invention also relates to a vascular support system.

30 Claims, 5 Drawing Sheets

(51) Int. Cl.
  *A61M 60/216* (2021.01)
  *A61M 60/515* (2021.01)
  *A61M 60/523* (2021.01)
  *A61M 60/546* (2021.01)
  *A61M 60/857* (2021.01)
(52) U.S. Cl.
  CPC ........ *A61M 60/515* (2021.01); *A61M 60/546* (2021.01); *A61M 60/857* (2021.01); *A61M 2205/3368* (2013.01); *A61M 2205/3653* (2013.01)
(58) Field of Classification Search
  CPC .............. A61M 60/174; A61M 60/178; A61M 60/274; A61M 60/422; A61M 60/816; A61M 60/825; A61M 2039/224; A61M 2039/226; A61M 2205/3334; A61M 2205/8243; A61M 2207/00; A61M 2210/1082; A61M 2210/12; A61M 39/22; A61M 39/223; A61M 60/113; A61M 60/122; A61M 60/13; A61M 60/135; A61M 60/216; A61M 60/226; A61M 60/33; A61M 60/411; A61M 60/414; A61M 60/515; A61M 60/538; A61M 60/546; A61M 60/554; A61M 60/592; A61M 60/808; A61M 60/833; A61M 60/861; A61M 60/876; A61M 60/892; A61M 60/896; A61B 5/02055; A61F 2/07
  See application file for complete search history.

(56) References Cited

U.S. PATENT DOCUMENTS

| | | |
|---|---|---|
| 4,559,952 A | 12/1985 | Angelsen et al. |
| 4,680,730 A | 7/1987 | Omoda |
| 4,781,525 A | 11/1988 | Hubbard et al. |
| 4,888,011 A | 12/1989 | Kung et al. |
| 4,889,131 A | 12/1989 | Salem et al. |
| 4,902,272 A | 2/1990 | Milder et al. |
| 5,045,051 A | 9/1991 | Milder et al. |
| 5,269,811 A * | 12/1993 | Hayes ................ A61M 60/833 623/3.24 |
| 5,289,821 A | 3/1994 | Swartz |
| 5,456,715 A | 10/1995 | Liotta |
| 5,527,159 A | 6/1996 | Bozeman, Jr. et al. |
| 5,581,038 A | 12/1996 | Lampropoulos |
| 5,613,935 A | 3/1997 | Jarvik |
| 5,662,115 A | 9/1997 | Torp |
| 5,676,651 A | 10/1997 | Larson, Jr. et al. |
| 5,720,771 A | 2/1998 | Snell |
| 5,752,976 A | 5/1998 | Duffin et al. |
| 5,766,207 A | 6/1998 | Potter et al. |
| 5,827,203 A | 10/1998 | Nita |
| 5,865,759 A | 2/1999 | Koblanski |
| 5,888,242 A | 3/1999 | Antaki et al. |
| 5,904,708 A | 5/1999 | Goedeke |
| 5,911,685 A | 6/1999 | Siess et al. |
| 5,964,694 A | 10/1999 | Siess et al. |
| 5,980,465 A | 11/1999 | Elgas |
| 6,007,478 A | 12/1999 | Siess et al. |
| 6,024,704 A | 2/2000 | Meador et al. |
| 6,053,873 A | 4/2000 | Govari et al. |
| 6,167,765 B1 | 1/2001 | Weitzel |
| 6,176,822 B1 | 1/2001 | Nix et al. |
| 6,183,412 B1 | 2/2001 | Benkowsi et al. |
| 6,185,460 B1 | 2/2001 | Thompson |
| 6,190,324 B1 | 2/2001 | Kieval et al. |
| 6,210,318 B1 | 4/2001 | Lederman |
| 6,231,498 B1 | 5/2001 | Pfeiffer et al. |
| 6,245,007 B1 | 6/2001 | Bedingham et al. |
| 6,314,322 B1 | 11/2001 | Rosenberg |
| 6,351,048 B1 | 2/2002 | Schob et al. |
| 6,398,734 B1 | 6/2002 | Cimochowski et al. |
| 6,432,136 B1 | 8/2002 | Weiss et al. |
| 6,438,409 B1 | 8/2002 | Malik et al. |
| 6,512,949 B1 | 1/2003 | Combs et al. |
| 6,530,876 B1 | 3/2003 | Spence |
| 6,540,658 B1 | 4/2003 | Fasciano et al. |
| 6,540,659 B1 | 4/2003 | Milbocker |
| 6,561,975 B1 | 5/2003 | Pool et al. |
| 6,579,257 B1 | 6/2003 | Elgas et al. |
| 6,602,182 B1 | 8/2003 | Milbocker |
| 6,605,032 B2 | 8/2003 | Benkowsi et al. |
| 6,652,447 B2 | 11/2003 | Benkowsi et al. |
| 6,731,976 B2 | 5/2004 | Penn et al. |
| 6,879,126 B2 | 4/2005 | Paden et al. |
| 6,912,423 B2 | 6/2005 | Ley et al. |
| 6,949,066 B2 | 9/2005 | Bearnson et al. |
| 6,984,201 B2 | 1/2006 | Khaghani et al. |
| 7,010,954 B2 | 3/2006 | Siess |
| 7,022,100 B1 | 4/2006 | Aboul-Hosn et al. |
| 7,024,244 B2 | 4/2006 | Muhlenberg et al. |
| 7,070,555 B2 | 7/2006 | Siess |
| 7,083,588 B1 | 8/2006 | Shmulewitz et al. |
| 7,138,776 B1 | 11/2006 | Gauthier et al. |
| 7,160,243 B2 | 1/2007 | Medvedev |
| 7,175,588 B2 | 2/2007 | Morello |
| 7,177,681 B2 | 2/2007 | Xhu |
| 7,238,151 B2 | 7/2007 | Frazier |
| 7,396,327 B2 | 7/2008 | Morello |
| 7,513,864 B2 | 4/2009 | Kantrowitz et al. |
| 7,520,850 B2 | 4/2009 | Brockway |
| 7,526,338 B1 | 4/2009 | Gill |
| 7,527,599 B2 | 5/2009 | Hickey |
| 7,591,777 B2 | 9/2009 | LaRose |
| 7,744,560 B2 | 6/2010 | Struble |
| 7,794,384 B2 | 9/2010 | Sugiura et al. |
| 7,819,916 B2 | 10/2010 | Yaegashi |
| 7,850,593 B2 | 12/2010 | Vincent et al. |
| 7,850,594 B2 | 12/2010 | Sutton et al. |
| 7,856,335 B2 | 12/2010 | Morello et al. |
| 7,862,501 B2 | 1/2011 | Woodward et al. |
| 7,951,062 B2 | 5/2011 | Morello |
| 7,951,129 B2 | 5/2011 | Chinchoy |
| 7,963,905 B2 | 6/2011 | Salmonsen et al. |
| 7,988,728 B2 | 8/2011 | Ayre |
| 8,075,472 B2 | 12/2011 | Zilbershlag et al. |
| 8,190,390 B2 | 5/2012 | Morello et al. |
| 8,211,028 B2 | 7/2012 | Karamanoglu et al. |
| 8,303,482 B2 | 11/2012 | Schima et al. |
| 8,323,173 B2 | 12/2012 | Benkowsi et al. |
| 8,435,182 B1 | 5/2013 | Tamura |
| 8,449,444 B2 | 5/2013 | Poirier |
| 8,545,380 B2 | 10/2013 | Farnan et al. |
| 8,585,572 B2 | 11/2013 | Mehmanesh |
| 8,591,393 B2 | 11/2013 | Walters et al. |
| 8,594,790 B2 | 11/2013 | Kjellstrom et al. |
| 8,622,949 B2 | 1/2014 | Zafirelis et al. |
| 8,657,733 B2 | 2/2014 | Ayre et al. |
| 8,657,875 B2 | 2/2014 | Kung et al. |
| 8,715,151 B2 | 5/2014 | Poirier |
| 8,747,293 B2 | 6/2014 | Arndt et al. |
| 8,849,398 B2 | 9/2014 | Evans |
| 8,864,643 B2 | 10/2014 | Reichenbach et al. |
| 8,864,644 B2 | 10/2014 | Yomtov |
| 8,876,685 B2 | 11/2014 | Crosby et al. |
| 8,882,477 B2 | 11/2014 | Fritz, IV et al. |
| 8,888,728 B2 | 11/2014 | Aboul-Hosn et al. |
| 8,897,873 B2 | 11/2014 | Schima et al. |
| 8,903,492 B2 | 12/2014 | Soykan et al. |
| 9,091,271 B2 | 7/2015 | Bourque |
| 9,297,735 B2 | 3/2016 | Graichen et al. |

(56) References Cited

U.S. PATENT DOCUMENTS

| | | | |
|---|---|---|---|
| 9,308,305 B2 | 4/2016 | Chen et al. |
| 9,345,824 B2 | 5/2016 | Mohl et al. |
| 9,371,826 B2 | 6/2016 | Yanai et al. |
| 9,427,508 B2 | 8/2016 | Reyes et al. |
| 9,427,509 B2 | 8/2016 | Vodermayer |
| 9,474,840 B2 | 10/2016 | Siess |
| 9,492,601 B2 | 11/2016 | Casas et al. |
| 9,511,179 B2 | 12/2016 | Casas et al. |
| 9,555,173 B2 | 1/2017 | Spanier |
| 9,555,175 B2 | 1/2017 | Bulent et al. |
| 9,556,873 B2 | 1/2017 | Yanai et al. |
| 9,566,374 B2 | 2/2017 | Spence et al. |
| 9,636,442 B2 | 5/2017 | Karmon et al. |
| 9,656,010 B2 | 5/2017 | Burke |
| 9,669,142 B2 | 6/2017 | Spanier et al. |
| 9,669,144 B2 | 6/2017 | Spanier et al. |
| 9,694,123 B2 | 7/2017 | Bourque et al. |
| 9,713,701 B2 | 7/2017 | Sarkar et al. |
| 9,744,282 B2 | 8/2017 | Rosenberg et al. |
| 9,789,236 B2 | 10/2017 | Bonde |
| 9,833,550 B2 | 12/2017 | Siess |
| 9,848,899 B2 | 12/2017 | Sliwa et al. |
| 9,849,224 B2 | 12/2017 | Angwin et al. |
| 9,878,087 B2 | 1/2018 | Richardson et al. |
| 9,943,236 B2 | 4/2018 | Bennett et al. |
| 9,950,102 B2 | 4/2018 | Spence et al. |
| 9,974,894 B2 | 5/2018 | Morello |
| 9,999,714 B2 | 6/2018 | Spanier et al. |
| 10,010,662 B2 | 7/2018 | Wiesener et al. |
| 10,022,480 B2 | 7/2018 | Greatrex et al. |
| 10,029,037 B2 | 7/2018 | Muller et al. |
| 10,052,420 B2 | 8/2018 | Medvedev et al. |
| 10,279,093 B2 | 5/2019 | Reichenbach et al. |
| 10,322,217 B2 | 6/2019 | Spence |
| 10,342,906 B2 | 7/2019 | D'Ambrosio et al. |
| 10,350,342 B2 | 7/2019 | Thomas et al. |
| 10,357,598 B2 | 7/2019 | Aboul-Hosn et al. |
| 10,376,162 B2 | 8/2019 | Edelman et al. |
| 10,413,651 B2 | 9/2019 | Yomtov et al. |
| 10,426,879 B2 | 10/2019 | Farnan |
| 10,449,275 B2 | 10/2019 | Corbett |
| 10,500,322 B2 | 12/2019 | Karch |
| 10,525,178 B2 | 1/2020 | Zeng |
| 10,549,020 B2 | 2/2020 | Spence et al. |
| 10,561,771 B2 | 2/2020 | Heilman et al. |
| 10,561,772 B2 | 2/2020 | Schumacher |
| 10,561,773 B2 | 2/2020 | Ferrari et al. |
| 10,632,241 B2 | 4/2020 | Schenck et al. |
| 10,660,998 B2 | 5/2020 | Hodges |
| 10,668,195 B2 | 6/2020 | Flores |
| 10,732,583 B2 | 8/2020 | Rudser |
| 10,857,275 B2 | 12/2020 | Granegger |
| 10,864,308 B2 | 12/2020 | Muller et al. |
| 11,027,114 B2 | 6/2021 | D'Ambrosio et al. |
| RE48,649 E | 7/2021 | Siess |
| 11,067,085 B2 | 7/2021 | Granegger et al. |
| 11,120,908 B2 | 9/2021 | Agnello et al. |
| 11,131,968 B2 | 9/2021 | Rudser |
| 11,147,960 B2 | 10/2021 | Spanier et al. |
| 11,154,701 B2 | 10/2021 | Reyes et al. |
| 11,154,702 B2 | 10/2021 | Kadrolkar et al. |
| 11,185,682 B2 | 11/2021 | Farnan |
| 11,191,945 B2 | 12/2021 | Siess et al. |
| 11,197,618 B2 | 12/2021 | Edelman et al. |
| 11,217,344 B2 | 1/2022 | Agnello |
| 11,235,139 B2 | 2/2022 | Kudlik |
| 11,241,572 B2 | 2/2022 | Dague et al. |
| 11,273,299 B2 | 3/2022 | Wolman et al. |
| 11,285,310 B2 | 3/2022 | Curran et al. |
| 11,285,311 B2 | 3/2022 | Siess et al. |
| 11,298,524 B2 | 4/2022 | El Katerji et al. |
| 11,311,711 B2 | 4/2022 | Casas et al. |
| 11,316,679 B2 | 4/2022 | Agnello |
| 11,320,382 B2 | 5/2022 | Aikawa |
| 11,324,395 B2 | 5/2022 | Banik et al. |
| 11,331,082 B2 | 5/2022 | Itoh et al. |
| 11,337,724 B2 | 5/2022 | Masubuchi et al. |
| 11,338,125 B2 | 5/2022 | Liu et al. |
| 11,351,356 B2 | 6/2022 | Mohl |
| 11,351,357 B2 | 6/2022 | Mohl |
| 11,351,358 B2 | 6/2022 | Nix et al. |
| 11,357,438 B2 | 6/2022 | Stewart et al. |
| 11,357,968 B2 | 6/2022 | El Katerji et al. |
| 11,376,415 B2 | 7/2022 | Mohl |
| 11,376,419 B2 | 7/2022 | Reyes et al. |
| 11,389,639 B2 | 7/2022 | Casas |
| 11,389,641 B2 | 7/2022 | Nguyen et al. |
| 11,413,444 B2 | 8/2022 | Nix et al. |
| 11,413,445 B2 | 8/2022 | Brown et al. |
| 11,420,041 B2 | 8/2022 | Karch |
| 11,439,806 B2 | 9/2022 | Kimball et al. |
| 11,446,481 B2 | 9/2022 | Wolman et al. |
| 11,478,629 B2 | 10/2022 | Harjes et al. |
| 11,517,740 B2 | 12/2022 | Agarwa et al. |
| 11,521,723 B2 | 12/2022 | Liu et al. |
| 11,524,165 B2 | 12/2022 | Tan et al. |
| 11,527,322 B2 | 12/2022 | Agnello et al. |
| 11,529,062 B2 | 12/2022 | Moyer et al. |
| 11,554,260 B2 | 1/2023 | Reyes et al. |
| 11,572,879 B2 | 2/2023 | Mohl |
| 11,574,741 B2 | 2/2023 | Tan et al. |
| 11,577,068 B2 | 2/2023 | Spence et al. |
| 11,581,083 B2 | 2/2023 | El Katerji et al. |
| 11,583,659 B2 | 2/2023 | Pfeffer et al. |
| 11,587,337 B2 | 2/2023 | Lemay et al. |
| 11,590,337 B2 | 2/2023 | Granegger et al. |
| 11,622,695 B1 | 4/2023 | Adriola et al. |
| 11,628,293 B2 | 4/2023 | Gandhi et al. |
| 11,639,722 B2 | 5/2023 | Medvedev et al. |
| 11,648,386 B2 | 5/2023 | Poirer |
| 11,653,841 B2 | 5/2023 | Reyes et al. |
| 11,666,746 B2 | 6/2023 | Ferrari et al. |
| 11,668,321 B2 | 6/2023 | Richert et al. |
| 11,674,517 B2 | 6/2023 | Mohl |
| 11,676,718 B2 | 6/2023 | Agnello et al. |
| 11,684,276 B2 | 6/2023 | Cros et al. |
| 11,684,769 B2 | 6/2023 | Harjes et al. |
| 11,694,539 B2 | 7/2023 | Kudlik et al. |
| 11,694,813 B2 | 7/2023 | El Katerji et al. |
| 11,696,782 B2 | 7/2023 | Carlson et al. |
| 11,707,617 B2 | 7/2023 | Reyes et al. |
| 11,712,167 B2 | 8/2023 | Medvedev et al. |
| 11,724,091 B2 | 8/2023 | Siess et al. |
| 11,754,077 B1 | 9/2023 | Mohl |
| D1,001,145 S | 10/2023 | Lussier et al. |
| D1,001,146 S | 10/2023 | Lussier et al. |
| 11,771,885 B2 | 10/2023 | Liu et al. |
| 11,779,234 B2 | 10/2023 | Harjes et al. |
| 11,781,551 B2 | 10/2023 | Yanai et al. |
| 11,790,487 B2 | 10/2023 | Barbato et al. |
| 11,793,994 B2 | 10/2023 | Josephy et al. |
| 11,806,116 B2 | 11/2023 | Tuval et al. |
| 11,806,517 B2 | 11/2023 | Petersen |
| 11,806,518 B2 | 11/2023 | Michelena et al. |
| 11,813,079 B2 | 11/2023 | Lau et al. |
| 11,818,782 B2 | 11/2023 | Doudian et al. |
| 11,824,381 B2 | 11/2023 | Conyers et al. |
| 11,826,127 B2 | 11/2023 | Casas |
| 11,832,793 B2 | 12/2023 | McWeeney et al. |
| 11,832,868 B2 | 12/2023 | Smail et al. |
| 11,837,364 B2 | 12/2023 | Lee et al. |
| 11,844,592 B2 | 12/2023 | Tuval et al. |
| 11,844,940 B2 | 12/2023 | D'Ambrosio et al. |
| 11,850,073 B2 | 12/2023 | Wright et al. |
| 11,850,414 B2 | 12/2023 | Schenck et al. |
| 11,850,415 B2 | 12/2023 | Schwammenthal et al. |
| D1,012,284 S | 1/2024 | Glaser et al. |
| 11,857,345 B2 | 1/2024 | Hanson et al. |
| 11,864,878 B2 | 1/2024 | Duval et al. |
| 11,872,384 B2 | 1/2024 | Cotter |
| 11,883,207 B2 | 1/2024 | El Katerji et al. |
| D1,014,552 S | 2/2024 | Lussier et al. |
| 11,890,082 B2 | 2/2024 | Cros et al. |
| 11,896,199 B2 | 2/2024 | Lent et al. |

(56) References Cited

U.S. PATENT DOCUMENTS

| | | |
|---|---|---|
| 11,900,660 B2 | 2/2024 | Saito et al. |
| 11,903,657 B2 | 2/2024 | Geric et al. |
| 11,906,411 B2 | 2/2024 | Graichen et al. |
| 11,911,550 B2 | 2/2024 | Itamochi et al. |
| D1,017,634 S | 3/2024 | Lussier et al. |
| D1,017,699 S | 3/2024 | Moore et al. |
| 11,923,078 B2 | 3/2024 | Fallen et al. |
| 11,923,093 B2 | 3/2024 | Moffitt et al. |
| 11,925,794 B2 | 3/2024 | Malkin et al. |
| 11,931,073 B2 | 3/2024 | Walsh et al. |
| 11,931,528 B2 | 3/2024 | Rohl et al. |
| 11,931,588 B2 | 3/2024 | Aghassian |
| 11,986,274 B2 | 5/2024 | Edelman |
| 12,017,076 B2 | 6/2024 | Tan et al. |
| 12,023,476 B2 | 7/2024 | Tuval et al. |
| 12,029,891 B2 | 7/2024 | Siess et al. |
| 12,059,559 B2 | 8/2024 | Muller et al. |
| D1,043,730 S | 9/2024 | Lussier et al. |
| D1,043,731 S | 9/2024 | Lussier et al. |
| 12,076,544 B2 | 9/2024 | Siess et al. |
| 12,097,016 B2 | 9/2024 | Goldvasser |
| 12,102,815 B2 | 10/2024 | Dhaliwal et al. |
| 12,144,650 B2 | 11/2024 | Spanier et al. |
| 12,144,976 B2 | 11/2024 | Baumbach et al. |
| 12,178,554 B2 | 12/2024 | Stotz et al. |
| 12,179,009 B2 | 12/2024 | El Katerji et al. |
| 12,183,459 B2 | 12/2024 | Agnello et al. |
| 12,194,287 B2 | 1/2025 | Kassel et al. |
| 12,201,821 B2 | 1/2025 | Schlebusch et al. |
| 12,211,615 B2 | 1/2025 | Nix et al. |
| D1,060,379 S | 2/2025 | Lussier et al. |
| 12,213,771 B2 | 2/2025 | Curran et al. |
| 12,217,850 B2 | 2/2025 | Agnello |
| 12,222,267 B2 | 2/2025 | Stotz et al. |
| 12,251,551 B2 | 3/2025 | Liu et al. |
| 12,257,424 B2 | 3/2025 | Schlebusch et al. |
| 12,268,861 B2 | 4/2025 | D'Ambrosio et al. |
| 12,296,158 B2 | 5/2025 | Higgins et al. |
| 12,296,159 B2 | 5/2025 | Schilling et al. |
| 12,310,621 B2 | 5/2025 | Murphy |
| 12,310,708 B2 | 5/2025 | Schlebusch et al. |
| 12,311,160 B2 | 5/2025 | Schlebusch et al. |
| 12,324,906 B2 | 6/2025 | Baumbach et al. |
| 12,329,501 B2 | 6/2025 | Moyer et al. |
| 12,329,956 B2 | 6/2025 | Sunagawa |
| 12,329,959 B2 | 6/2025 | Hassan et al. |
| 12,343,518 B2 | 7/2025 | Tuval et al. |
| 2001/0016686 A1 | 8/2001 | Okada et al. |
| 2001/0037093 A1 | 11/2001 | Benkowski et al. |
| 2001/0039828 A1 | 11/2001 | Shin et al. |
| 2002/0022785 A1 | 2/2002 | Romano |
| 2002/0082585 A1 | 6/2002 | Carroll et al. |
| 2002/0093412 A1 | 7/2002 | Morrison |
| 2002/0147495 A1 | 10/2002 | Petroff |
| 2002/0151761 A1 | 10/2002 | Viole et al. |
| 2003/0069465 A1 | 4/2003 | Benkowski et al. |
| 2003/0130581 A1 | 7/2003 | Salo et al. |
| 2003/0139643 A1 | 7/2003 | Smith et al. |
| 2003/0167002 A1 | 9/2003 | Nagar et al. |
| 2003/0191357 A1 | 10/2003 | Frazier |
| 2003/0199727 A1 | 10/2003 | Burke |
| 2004/0022640 A1 | 2/2004 | Siess et al. |
| 2004/0044266 A1 | 3/2004 | Siess et al. |
| 2004/0065143 A1 | 4/2004 | Husher |
| 2004/0124979 A1 | 7/2004 | Medema |
| 2004/0130009 A1 | 7/2004 | Tangpuz |
| 2004/0167376 A1 | 8/2004 | Peters et al. |
| 2004/0167410 A1 | 8/2004 | Hettrick |
| 2004/0225177 A1 | 11/2004 | Coleman et al. |
| 2004/0241019 A1 | 12/2004 | Goldowsky |
| 2004/0260346 A1 | 12/2004 | Overall et al. |
| 2005/0001324 A1 | 1/2005 | Dunn |
| 2005/0019167 A1 | 1/2005 | Nusser et al. |
| 2005/0107658 A1 | 5/2005 | Brockway |
| 2005/0126268 A1 | 6/2005 | Ouriev et al. |
| 2005/0267322 A1 | 12/2005 | LaRose |
| 2006/0030809 A1 | 2/2006 | Barzilay et al. |
| 2006/0108697 A1 | 5/2006 | Wang |
| 2006/0108901 A1 | 5/2006 | Mao-Chin et al. |
| 2006/0122583 A1 | 6/2006 | Pesach et al. |
| 2006/0196277 A1 | 9/2006 | Allen et al. |
| 2006/0229488 A1 | 10/2006 | Ayre et al. |
| 2006/0287600 A1 | 12/2006 | McEowen |
| 2006/0287604 A1 | 12/2006 | Hickey |
| 2007/0060787 A1 | 3/2007 | Peters et al. |
| 2007/0069354 A1 | 3/2007 | Dangelmaier |
| 2007/0073352 A1 | 3/2007 | Euler et al. |
| 2007/0088214 A1 | 4/2007 | Shuros et al. |
| 2007/0156006 A1 | 7/2007 | Smith et al. |
| 2007/0255352 A1 | 11/2007 | Roline et al. |
| 2007/0266778 A1 | 11/2007 | Corey et al. |
| 2007/0282209 A1 | 12/2007 | Lui et al. |
| 2007/0299325 A1 | 12/2007 | Farrell et al. |
| 2008/0015517 A1 | 1/2008 | Geistert et al. |
| 2008/0082005 A1 | 4/2008 | Stern et al. |
| 2008/0091239 A1 | 4/2008 | Johansson et al. |
| 2008/0097595 A1 | 4/2008 | Gabbay |
| 2008/0102096 A1 | 5/2008 | Molin et al. |
| 2008/0108901 A1 | 5/2008 | Baba et al. |
| 2008/0108930 A1 | 5/2008 | Weitzel et al. |
| 2008/0133006 A1 | 6/2008 | Crosby et al. |
| 2008/0146996 A1 | 6/2008 | Smisson |
| 2008/0210016 A1 | 9/2008 | Zwirn et al. |
| 2008/0248614 A1 | 10/2008 | Yang |
| 2008/0262289 A1 | 10/2008 | Goldowsky |
| 2008/0262361 A1 | 10/2008 | Gutfinger et al. |
| 2008/0269822 A1 | 10/2008 | Ljungstrom et al. |
| 2008/0275339 A1 | 11/2008 | Thiemann et al. |
| 2008/0306328 A1 | 12/2008 | Ercolani |
| 2009/0024042 A1 | 1/2009 | Nunez et al. |
| 2009/0025459 A1 | 1/2009 | Zhang et al. |
| 2009/0064755 A1 | 3/2009 | Fleischli et al. |
| 2009/0105799 A1 | 4/2009 | Hekmat et al. |
| 2009/0131765 A1 | 5/2009 | Roschak et al. |
| 2009/0204163 A1 | 8/2009 | Shuros et al. |
| 2009/0226328 A1 | 9/2009 | Morello |
| 2009/0312650 A1 | 12/2009 | Maile et al. |
| 2010/0010354 A1 | 1/2010 | Skerl et al. |
| 2010/0082099 A1 | 4/2010 | Vodermayer et al. |
| 2010/0087742 A1 | 4/2010 | Bishop et al. |
| 2010/0160801 A1 | 6/2010 | Takatani et al. |
| 2010/0219967 A1 | 9/2010 | Kaufmann |
| 2010/0222632 A1 | 9/2010 | Poirier |
| 2010/0222633 A1 | 9/2010 | Poirier |
| 2010/0222635 A1 | 9/2010 | Poirier |
| 2010/0222878 A1 | 9/2010 | Poirier |
| 2010/0268017 A1 | 10/2010 | Siess |
| 2010/0298625 A1 | 11/2010 | Reichenbach et al. |
| 2010/0324378 A1 | 12/2010 | Tran et al. |
| 2011/0004075 A1 | 1/2011 | Stahmann et al. |
| 2011/0022057 A1 | 1/2011 | Eigler et al. |
| 2011/0071336 A1 | 3/2011 | Yomtov |
| 2011/0144744 A1 | 6/2011 | Wampler |
| 2011/0160516 A1 | 6/2011 | Dague |
| 2011/0172505 A1 | 7/2011 | Kim |
| 2011/0184301 A1 | 7/2011 | Holmstrom |
| 2011/0186943 A1 | 8/2011 | Pahl |
| 2011/0218435 A1 | 9/2011 | Srinivasan et al. |
| 2011/0230068 A1 | 9/2011 | Pahl |
| 2012/0022645 A1 | 1/2012 | Burke |
| 2012/0029408 A1* | 2/2012 | Beaudin .......... A61M 1/369 604/4.01 |
| 2012/0084024 A1 | 4/2012 | Norcross, Jr. |
| 2012/0150089 A1 | 6/2012 | Penka et al. |
| 2012/0150291 A1 | 6/2012 | Aber |
| 2012/0197141 A1 | 8/2012 | Vanney |
| 2012/0203476 A1 | 8/2012 | Dam |
| 2012/0245404 A1 | 9/2012 | Smith |
| 2012/0247200 A1 | 10/2012 | Ahonen et al. |
| 2012/0310037 A1 | 12/2012 | Choi et al. |
| 2012/0330214 A1 | 12/2012 | Peters et al. |
| 2013/0041204 A1 | 2/2013 | Heilman et al. |
| 2013/0046129 A1 | 2/2013 | Medvedev et al. |
| 2013/0066141 A1 | 3/2013 | Doerr et al. |

(56) References Cited

U.S. PATENT DOCUMENTS

| | | |
|---|---|---|
| 2013/0066142 A1 | 3/2013 | Doerr et al. |
| 2013/0072846 A1 | 3/2013 | Heide et al. |
| 2013/0116575 A1 | 5/2013 | Mickle et al. |
| 2013/0144379 A1 | 6/2013 | Najafi et al. |
| 2013/0289334 A1 | 10/2013 | Badstibner |
| 2013/0289376 A1 | 10/2013 | Lang |
| 2013/0303831 A1 | 11/2013 | Evans |
| 2013/0304404 A1 | 11/2013 | Dam |
| 2014/0013852 A1 | 1/2014 | Brown et al. |
| 2014/0030122 A1 | 1/2014 | Ozaki |
| 2014/0100414 A1 | 4/2014 | Tamez et al. |
| 2014/0114202 A1 | 4/2014 | Hein et al. |
| 2014/0128659 A1 | 5/2014 | Heuring et al. |
| 2014/0200389 A1 | 7/2014 | Yanai et al. |
| 2014/0243688 A1 | 8/2014 | Caron et al. |
| 2014/0275720 A1 | 9/2014 | Ferrari |
| 2014/0275727 A1 | 9/2014 | Bonde |
| 2014/0296677 A1 | 10/2014 | McEowen |
| 2014/0303426 A1* | 10/2014 | Kerkhoffs ............ A61M 60/216 600/16 |
| 2014/0342203 A1 | 11/2014 | Elian |
| 2015/0032007 A1 | 1/2015 | Ottevanger et al. |
| 2015/0080743 A1 | 3/2015 | Siess |
| 2015/0141832 A1 | 5/2015 | Yu et al. |
| 2015/0141842 A1 | 5/2015 | Spanier et al. |
| 2015/0157216 A1 | 6/2015 | Stigall et al. |
| 2015/0174307 A1 | 6/2015 | Eckman et al. |
| 2015/0190092 A1 | 7/2015 | Mori |
| 2015/0196076 A1 | 7/2015 | Billingslea |
| 2015/0201900 A1 | 7/2015 | Syed |
| 2015/0250935 A1 | 9/2015 | Anderson et al. |
| 2015/0273184 A1 | 10/2015 | Scott et al. |
| 2015/0290372 A1 | 10/2015 | Muller et al. |
| 2015/0306290 A1 | 10/2015 | Rosenberg et al. |
| 2015/0306291 A1 | 10/2015 | Bonde et al. |
| 2015/0307344 A1 | 10/2015 | Ernst |
| 2015/0327921 A1 | 11/2015 | Govari |
| 2015/0335804 A1 | 11/2015 | Marseille et al. |
| 2015/0365738 A1 | 12/2015 | Purvis et al. |
| 2016/0000983 A1 | 1/2016 | Mohl et al. |
| 2016/0008531 A1 | 1/2016 | Wang et al. |
| 2016/0022889 A1 | 1/2016 | Bluvshtein et al. |
| 2016/0022890 A1* | 1/2016 | Schwammenthal ........................ A61M 60/825 600/16 |
| 2016/0045165 A1 | 2/2016 | Braido et al. |
| 2016/0095968 A1 | 4/2016 | Rudser |
| 2016/0101230 A1 | 4/2016 | Ochsner et al. |
| 2016/0144166 A1 | 5/2016 | Decré et al. |
| 2016/0151553 A1 | 6/2016 | Bonde |
| 2016/0166747 A1 | 6/2016 | Frazier et al. |
| 2016/0213828 A1 | 7/2016 | Sievers |
| 2016/0250399 A1 | 9/2016 | Tiller et al. |
| 2016/0278856 A1 | 9/2016 | Panescu |
| 2016/0302672 A1 | 10/2016 | Kuri |
| 2016/0303299 A1 | 10/2016 | Muller |
| 2016/0317043 A1 | 11/2016 | Campo |
| 2016/0338629 A1 | 11/2016 | Doerr |
| 2017/0010144 A1 | 1/2017 | Lenner et al. |
| 2017/0021070 A1 | 1/2017 | Petersen |
| 2017/0049945 A1 | 2/2017 | Halvorsen et al. |
| 2017/0086780 A1 | 3/2017 | Sokulin et al. |
| 2017/0098491 A1 | 4/2017 | Ziaie et al. |
| 2017/0112985 A1 | 4/2017 | Yomtov |
| 2017/0128646 A1 | 5/2017 | Karch |
| 2017/0136164 A1 | 5/2017 | Yeatts |
| 2017/0202575 A1 | 7/2017 | Stanfield et al. |
| 2017/0224279 A1 | 8/2017 | Cahan et al. |
| 2017/0239407 A1 | 8/2017 | Hayward |
| 2017/0258980 A1 | 9/2017 | Katsuki et al. |
| 2017/0348470 A1 | 12/2017 | D'Ambrosio et al. |
| 2017/0354812 A1 | 12/2017 | Callaghan et al. |
| 2018/0064860 A1* | 3/2018 | Nunez ................ A61M 60/816 |
| 2018/0078159 A1 | 3/2018 | Edelman et al. |
| 2018/0093070 A1 | 4/2018 | Cottone |
| 2018/0110910 A1 | 4/2018 | Rodemerk et al. |
| 2018/0126053 A1 | 5/2018 | Zilbershlag et al. |
| 2018/0199635 A1 | 7/2018 | Longinotti-Buitoni et al. |
| 2018/0250457 A1 | 9/2018 | Morello et al. |
| 2018/0256796 A1 | 9/2018 | Hansen |
| 2018/0256800 A1 | 9/2018 | Conyers et al. |
| 2018/0264182 A1 | 9/2018 | Spanier et al. |
| 2018/0280598 A1 | 10/2018 | Curran et al. |
| 2018/0316209 A1 | 11/2018 | Gliner |
| 2018/0326131 A1 | 11/2018 | Muller et al. |
| 2018/0333059 A1 | 11/2018 | Casas |
| 2018/0353667 A1 | 12/2018 | Moyer et al. |
| 2018/0369469 A1 | 12/2018 | Le Duc De Lillers et al. |
| 2019/0001038 A1 | 1/2019 | Yomtov et al. |
| 2019/0054223 A1 | 2/2019 | Frazier et al. |
| 2019/0083690 A1 | 3/2019 | Siess et al. |
| 2019/0192752 A1 | 6/2019 | Tiller et al. |
| 2019/0192753 A1 | 6/2019 | Liu et al. |
| 2019/0209755 A1 | 7/2019 | Nix et al. |
| 2019/0209758 A1 | 7/2019 | Tuval et al. |
| 2019/0216995 A1 | 7/2019 | Kapur et al. |
| 2019/0217002 A1 | 7/2019 | Urakabe |
| 2019/0223877 A1 | 7/2019 | Nitzen et al. |
| 2019/0240680 A1 | 8/2019 | Hayakawa |
| 2019/0254543 A1 | 8/2019 | Hartholt et al. |
| 2019/0282741 A1 | 9/2019 | Franano et al. |
| 2019/0282744 A1 | 9/2019 | D'Ambrosio et al. |
| 2019/0351117 A1 | 11/2019 | Cambronne et al. |
| 2019/0351118 A1 | 11/2019 | Graichen et al. |
| 2020/0016309 A1 | 1/2020 | Kallenbach et al. |
| 2020/0028376 A1 | 1/2020 | Ha |
| 2020/0038567 A1 | 2/2020 | Siess et al. |
| 2020/0060559 A1 | 2/2020 | Edelman et al. |
| 2020/0069857 A1 | 3/2020 | Schwammenthal et al. |
| 2020/0147283 A1 | 5/2020 | Tanner et al. |
| 2020/0164125 A1 | 5/2020 | Muller et al. |
| 2020/0164126 A1 | 5/2020 | Muller |
| 2020/0253583 A1 | 8/2020 | Brisken et al. |
| 2020/0312450 A1 | 10/2020 | Agnello et al. |
| 2021/0268264 A1 | 9/2021 | Stotz |
| 2021/0290087 A1 | 9/2021 | Schlebusch |
| 2021/0290930 A1 | 9/2021 | Kasel |
| 2021/0290933 A1 | 9/2021 | Stotz |
| 2021/0339002 A1 | 11/2021 | Schlebusch et al. |
| 2021/0339004 A1 | 11/2021 | Schlebusch et al. |
| 2021/0346675 A1 | 11/2021 | Schlebusch et al. |
| 2021/0346676 A1 | 11/2021 | Schlebusch et al. |
| 2021/0346677 A1 | 11/2021 | Baumbach et al. |
| 2021/0346678 A1 | 11/2021 | Baumbach et al. |
| 2021/0378523 A1 | 12/2021 | Budde |
| 2021/0379359 A1 | 12/2021 | Schellenberg |
| 2021/0379360 A1 | 12/2021 | Schellenberg |
| 2021/0393944 A1 | 12/2021 | Wenning |
| 2022/0016411 A1 | 1/2022 | Winterwerber |
| 2022/0032032 A1 | 2/2022 | Schlebusch et al. |
| 2022/0032036 A1 | 2/2022 | Baumbach et al. |
| 2022/0039669 A1 | 2/2022 | Schlebusch et al. |
| 2022/0047173 A1 | 2/2022 | Stotz et al. |
| 2022/0050037 A1 | 2/2022 | Stotz et al. |
| 2022/0072298 A1 | 3/2022 | Spanier et al. |
| 2022/0076807 A1 | 3/2022 | Agnello |
| 2022/0079457 A1 | 3/2022 | Tuval et al. |
| 2022/0105339 A1 | 4/2022 | Nix et al. |
| 2022/0126085 A1 | 4/2022 | Farnan |
| 2022/0126086 A1 | 4/2022 | Schlebusch et al. |
| 2022/0142462 A1 | 5/2022 | Douk et al. |
| 2022/0161019 A1 | 5/2022 | Mitze et al. |
| 2022/0361762 A1 | 11/2022 | Lalancette |
| 2023/0173250 A1 | 6/2023 | Stigloher |
| 2023/0191141 A1 | 6/2023 | Wenning et al. |
| 2024/0011808 A1 | 1/2024 | Winzer et al. |
| 2024/0074828 A1 | 3/2024 | Wenning |
| 2024/0245902 A1 | 7/2024 | Schlebusch et al. |
| 2025/0032773 A1 | 1/2025 | Baumbach et al. |
| 2025/0121177 A1 | 4/2025 | West |
| 2025/0143587 A1 | 5/2025 | Stotz |

(56) References Cited

U.S. PATENT DOCUMENTS

2025/0144397 A1 5/2025 Kassel et al.
2025/0222247 A1 7/2025 Schlebusch

FOREIGN PATENT DOCUMENTS

| | | |
|---|---|---|
| CN | 1222862 A | 7/1999 |
| CN | 1202871 C | 5/2005 |
| CN | 1661338 A | 8/2005 |
| CN | 101128168 | 2/2008 |
| CN | 101208045 | 6/2008 |
| CN | 101214158 | 7/2008 |
| CN | 101351237 | 1/2009 |
| CN | 101448535 | 6/2009 |
| CN | 101460094 | 6/2009 |
| CN | 101579233 | 11/2009 |
| CN | 201437016 | 4/2010 |
| CN | 101711683 | 5/2010 |
| CN | 201658687 | 12/2010 |
| CN | 102421372 | 4/2012 |
| CN | 102803923 | 11/2012 |
| CN | 103328018 | 9/2013 |
| CN | 103857326 | 6/2014 |
| CN | 103957957 | 7/2014 |
| CN | 104105449 | 10/2014 |
| CN | 104188687 | 12/2014 |
| CN | 106104229 | 11/2016 |
| CN | 106333707 | 1/2017 |
| CN | 206007680 | 3/2017 |
| CN | 107530479 | 1/2018 |
| CN | 107632167 | 1/2018 |
| CN | 109939282 | 6/2019 |
| CN | 209790495 | 12/2019 |
| CN | 210020563 | 2/2020 |
| CN | 215841206 | 2/2022 |
| CN | 217828630 | 11/2022 |
| CN | 219250364 | 6/2023 |
| CN | 118320294 | 7/2024 |
| CN | 113769260 | 9/2024 |
| CN | 118920928 | 11/2024 |
| DE | 195 20 920 | 12/1995 |
| DE | 198 21 307 | 10/1999 |
| DE | 100 59 714 | 5/2002 |
| DE | 100 60 275 | 6/2002 |
| DE | 101 44 269 | 3/2003 |
| DE | 102 26 305 | 10/2003 |
| DE | 10 2006 001 180 | 9/2007 |
| DE | 10 2009 007 216 | 8/2010 |
| DE | 10 2009 011 726 | 9/2010 |
| DE | 10 2009 025 464 | 1/2011 |
| DE | 10 2009 047 845 | 3/2011 |
| DE | 10 2011 106 142 | 12/2012 |
| DE | 20 2011 110 389 | 9/2013 |
| DE | 10 2015 004 177 | 10/2015 |
| DE | 10 2015 219 263 | 4/2017 |
| DE | 10 2015 222 199 | 5/2017 |
| DE | 20 2015 009 422 | 7/2017 |
| DE | 10 2012 207 042 | 9/2017 |
| DE | 10 2016 013 334 | 4/2018 |
| DE | 10 2018 208 536 | 12/2019 |
| DE | 10 2018 208 862 | 12/2019 |
| DE | 10 2018 208 916 | 12/2019 |
| DE | 10 2018 208 927 | 12/2019 |
| DE | 10 2018 208 945 | 12/2019 |
| DE | 10 2018 210 076 | 12/2019 |
| DE | 10 2018 212 153 | 1/2020 |
| DE | 10 2018 213 151 | 2/2020 |
| DE | 10 2018 213 350 | 2/2020 |
| DE | 10 2018 220 658 | 6/2020 |
| DE | 10 2018 222 505 | 6/2020 |
| DE | 10 2020 102 473 | 8/2021 |
| DE | 11 2020 003 151 | 3/2022 |
| EP | 0 794 411 | 9/1997 |
| EP | 0 916 359 | 5/1999 |
| EP | 1 062 959 | 12/2000 |
| EP | 1 339 443 | 11/2001 |
| EP | 1 011 803 | 9/2004 |
| EP | 1 354 606 | 6/2006 |
| EP | 2 143 385 | 1/2010 |
| EP | 2 175 770 | 4/2010 |
| EP | 2 187 807 | 6/2012 |
| EP | 2 570 143 | 3/2013 |
| EP | 2 401 003 | 10/2013 |
| EP | 1 871 441 | 11/2014 |
| EP | 2 859 911 | 4/2015 |
| EP | 2 213 227 | 8/2016 |
| EP | 2 835 141 | 8/2016 |
| EP | 3 088 016 | 11/2016 |
| EP | 2 585 129 | 3/2017 |
| EP | 2 945 661 | 11/2017 |
| EP | 2 136 861 | 12/2017 |
| EP | 3 020 426 | 12/2017 |
| EP | 3 287 154 | 2/2018 |
| EP | 3 205 359 | 8/2018 |
| EP | 3 205 360 | 8/2018 |
| EP | 3 378 421 | 9/2018 |
| EP | 3 478 333 | 5/2019 |
| EP | 3 389 738 | 8/2019 |
| EP | 2 505 090 | 12/2019 |
| EP | 3 668 560 | 6/2020 |
| EP | 3 720 520 | 10/2020 |
| EP | 3 753 594 | 12/2020 |
| EP | 3 357 523 | 1/2021 |
| EP | 3 490 628 | 2/2021 |
| EP | 3 487 548 | 3/2021 |
| EP | 3 509 661 | 3/2021 |
| EP | 3 515 523 | 3/2021 |
| EP | 3 528 863 | 3/2021 |
| EP | 3 615 103 | 3/2021 |
| EP | 3 131 600 | 6/2021 |
| EP | 3 131 615 | 6/2021 |
| EP | 3 463 505 | 9/2021 |
| EP | 3 884 970 | 9/2021 |
| EP | 2 599 510 | 10/2021 |
| EP | 3 003 421 | 10/2021 |
| EP | 3 027 241 | 10/2021 |
| EP | 3 668 561 | 10/2021 |
| EP | 3 164 168 | 12/2021 |
| EP | 3 344 129 | 12/2021 |
| EP | 3 624 867 | 3/2022 |
| EP | 3 651 822 | 3/2022 |
| EP | 3 689 389 | 3/2022 |
| EP | 3 737 436 | 3/2022 |
| EP | 3 972 661 | 3/2022 |
| EP | 3 984 589 | 4/2022 |
| EP | 3 654 006 | 5/2022 |
| EP | 3 737 310 | 7/2022 |
| EP | 2 999 400 | 8/2022 |
| EP | 3 711 788 | 8/2022 |
| EP | 3 694 573 | 9/2022 |
| EP | 3 600 477 | 10/2022 |
| EP | 3 897 768 | 10/2022 |
| EP | 2 892 583 | 1/2023 |
| EP | 3 370 797 | 1/2023 |
| EP | 3 597 231 | 1/2023 |
| EP | 3 668 562 | 1/2023 |
| EP | 3 856 275 | 1/2023 |
| EP | 3 003 420 | 2/2023 |
| EP | 3 397 299 | 2/2023 |
| EP | 3 046 594 | 3/2023 |
| EP | 3 938 005 | 4/2023 |
| EP | 3 685 562 | 5/2023 |
| EP | 3 397 298 | 7/2023 |
| EP | 3 809 959 | 7/2023 |
| EP | 2 072 150 | 9/2023 |
| EP | 2 961 984 | 9/2023 |
| EP | 3 352 808 | 9/2023 |
| EP | 3 768 156 | 9/2023 |
| EP | 4 052 754 | 10/2023 |
| EP | 3 157 596 | 11/2023 |
| EP | 3 766 428 | 11/2023 |
| EP | 3 781 027 | 11/2023 |
| EP | 4 061 470 | 11/2023 |
| EP | 4 070 720 | 11/2023 |
| EP | 3 449 958 | 12/2023 |

(56) References Cited

FOREIGN PATENT DOCUMENTS

| | | |
|---|---|---|
| EP | 3 687 596 | 12/2023 |
| EP | 3 768 340 | 12/2023 |
| EP | 3 801 675 | 1/2024 |
| EP | 3 566 636 | 2/2024 |
| EP | 3 634 526 | 2/2024 |
| EP | 3 768 347 | 2/2024 |
| EP | 3 790 606 | 2/2024 |
| EP | 3 930 780 | 2/2024 |
| EP | 3 397 147 | 3/2024 |
| EP | 3 782 695 | 3/2024 |
| EP | 3 854 448 | 3/2024 |
| EP | 4 271 461 | 3/2024 |
| EP | 4 140 532 | 5/2024 |
| EP | 3 693 038 | 6/2024 |
| EP | 3 970 765 | 7/2024 |
| EP | 3 854 444 | 9/2024 |
| EP | 3 793 674 | 10/2024 |
| EP | 3 618 885 | 11/2024 |
| EP | 4 034 221 | 11/2024 |
| EP | 3 809 960 | 12/2024 |
| EP | 3 854 446 | 2/2025 |
| EP | 4 429 754 | 2/2025 |
| EP | 3 970 785 | 3/2025 |
| EP | 4 429 753 | 3/2025 |
| EP | 3 950 043 | 5/2025 |
| EP | 3 899 964 | 6/2025 |
| EP | 4 039 319 | 6/2025 |
| ES | 2 913 485 | 6/2022 |
| JP | S59-080229 | 5/1984 |
| JP | S61-125329 | 6/1986 |
| JP | S62-113555 | 7/1987 |
| JP | S62-204733 | 9/1987 |
| JP | S62-282284 | 12/1987 |
| JP | S64-68236 | 3/1989 |
| JP | H02-055886 | 2/1990 |
| JP | H02-234750 | 9/1990 |
| JP | H05-079875 | 3/1993 |
| JP | H06-218044 | 8/1994 |
| JP | H07-047025 | 5/1995 |
| JP | H08-057042 | 3/1996 |
| JP | H08-066398 | 3/1996 |
| JP | H08-327527 | 12/1996 |
| JP | H10-052489 | 2/1998 |
| JP | H10-505766 | 6/1998 |
| JP | H11-239617 | 9/1999 |
| JP | 2000-512191 | 9/2000 |
| JP | 2001-037728 | 2/2001 |
| JP | 2001-506140 | 5/2001 |
| JP | 2001-276213 | 10/2001 |
| JP | 2002-525175 | 8/2002 |
| JP | 2003-019197 | 1/2003 |
| JP | 2003-047656 | 2/2003 |
| JP | 2003-062065 | 3/2003 |
| JP | 2004-515278 | 5/2004 |
| JP | 2005-028137 | 2/2005 |
| JP | 2005-192687 | 7/2005 |
| JP | 2006-528006 | 12/2006 |
| JP | 2007-222644 | 9/2007 |
| JP | 2008-511414 | 4/2008 |
| JP | 2006-518249 | 8/2008 |
| JP | 2008-178690 | 8/2008 |
| JP | 2009-504290 | 2/2009 |
| JP | 2009-240348 | 10/2009 |
| JP | 2010-518907 | 6/2010 |
| JP | 2012-520157 | 9/2012 |
| JP | 2013-128792 | 7/2013 |
| JP | 2014-524274 | 9/2014 |
| JP | 2015-514529 | 5/2015 |
| JP | 2015-514531 | 5/2015 |
| JP | 2015-515429 | 5/2015 |
| JP | 2015-122448 | 7/2015 |
| JP | 2015-527172 | 9/2015 |
| JP | 2015-181800 | 10/2015 |
| JP | 2016-002466 | 1/2016 |
| JP | 2016-509950 | 4/2016 |
| JP | 2017-500932 | 1/2017 |
| JP | 2017-176719 | 10/2017 |
| JP | 2017-532084 | 11/2017 |
| JP | 2019-523110 | 8/2019 |
| JP | 2020-072985 | 5/2020 |
| WO | WO 89/006513 | 1/1989 |
| WO | WO 92/015239 | 9/1992 |
| WO | WO 94/009835 | 5/1994 |
| WO | WO 98/043688 | 10/1998 |
| WO | WO 00/033047 | 6/2000 |
| WO | WO 2006/122001 | 11/2006 |
| WO | WO 2010/142286 | 12/2010 |
| WO | WO 2010/143272 | 12/2010 |
| WO | WO 2012/018917 | 2/2012 |
| WO | WO 2012/112378 | 8/2012 |
| WO | WO 2013/160443 | 10/2013 |
| WO | WO 2014/042925 | 3/2014 |
| WO | WO 2014/141284 | 9/2014 |
| WO | WO 2014/165635 | 10/2014 |
| WO | WO 2015/085220 | 6/2015 |
| WO | WO 2016/001284 | 1/2016 |
| WO | WO 2016/066180 | 5/2016 |
| WO | WO 2016/137743 | 9/2016 |
| WO | WO 2017/032751 | 3/2017 |
| WO | WO 2017/066257 | 4/2017 |
| WO | WO 2017/106190 | 6/2017 |
| WO | WO 2017/147291 | 8/2017 |
| WO | WO 2017/214118 | 12/2017 |
| WO | WO 2018/005228 | 1/2018 |
| WO | WO 2018/048800 | 3/2018 |
| WO | WO 2018/109038 | 6/2018 |
| WO | WO 2018/213089 | 11/2018 |
| WO | WO 2019/013794 | 1/2019 |
| WO | WO 2019/034670 | 2/2019 |
| WO | WO 2019/034775 | 2/2019 |
| WO | WO 2019/078723 | 4/2019 |
| WO | WO 2019/126721 | 6/2019 |
| WO | WO 2019/137911 | 7/2019 |
| WO | WO 2019/193604 | 10/2019 |
| WO | WO 2019/219883 | 11/2019 |
| WO | WO 2019/229210 | 12/2019 |
| WO | WO 2019/229220 | 12/2019 |
| WO | WO 2019/234145 | 12/2019 |
| WO | WO 2019/234146 | 12/2019 |
| WO | WO 2019/234148 | 12/2019 |
| WO | WO 2019/234149 | 12/2019 |
| WO | WO 2019/234151 | 12/2019 |
| WO | WO 2019/234152 | 12/2019 |
| WO | WO 2019/234153 | 12/2019 |
| WO | WO 2019/234161 | 12/2019 |
| WO | WO 2019/234162 | 12/2019 |
| WO | WO 2019/234163 | 12/2019 |
| WO | WO 2019/234164 | 12/2019 |
| WO | WO 2019/234166 | 12/2019 |
| WO | WO 2019/234167 | 12/2019 |
| WO | WO 2019/234169 | 12/2019 |
| WO | WO 2019/243582 | 12/2019 |
| WO | WO 2020/030686 | 2/2020 |
| WO | WO 2020/030706 | 2/2020 |
| WO | WO 2020/064707 | 4/2020 |
| WO | WO 2020/089429 | 5/2020 |
| WO | WO 2020/198280 | 10/2020 |
| WO | WO 2020/243756 | 12/2020 |
| WO | WO 2023/040546 | 12/2021 |
| WO | WO 2022/074136 | 4/2022 |
| WO | WO 2022/109590 | 5/2022 |
| WO | WO 2022/173970 | 8/2022 |
| WO | WO 2023/226779 | 9/2022 |
| WO | WO 2023/049813 | 3/2023 |
| WO | WO 2024/104184 | 5/2024 |

OTHER PUBLICATIONS

International Search Report and Written Opinion received in PCT Application No. PCT/EP2019/064800, dated Aug. 28, 2019 in 10 pages.

(56) References Cited

OTHER PUBLICATIONS

International Preliminary Report on Patentability and Written Opinion received in PCT Application No. PCT/EP2019/064800, dated Dec. 17, 2020 in 7 pages.
Kong et al., "A Stein Equation Approach for Solutions to the Diophantine Equations," 2010 Chinese Control and Decision Conference, Xuzhou, May 26, 2010, pp. 3024-3028.
Koseli et al., "Online Viscosity Measurement of Complex Solutions Using Ultrasound Doppler Velocimetry", Turk J Chem, Jan. 2006, vol. 30, pp. 297-305.
McCormick et al., "Resolution of a 2/spl pi/ Ambiguity Problem in Multiple Frequency Spectral Estimation," in IEEE Transactions on Aerospace and Electronic Systems, Jan. 1995, vol. 31, No. 1, pp. 2-8.
Syrmos et al., "A Generalized Bezout Equation in Output Feedback Design," Proceedings of the 31st IEEE Conference on Decision and Control, Tucson, AZ, USA, Dec. 1992, vol. 4, pp. 3590-3594.
Udesen et al., "A Simple Method to Reduce Aliasing Artifacts in Color Flow Mode Imaging", IEEE Ultrasonics Symposium, 2005, Rotterdam, The Netherlands, Sep. 18-21, 2005, pp. 1352-1355.
Atkinson et al., "Pulse-Doppler Ultrasound and Its Clinical Application", The Yale Journal of Biology and Medicine, 1977, vol. 50, pp. 367-373.
Leguy et al., "Assessment of Blood Volume Flow in Slightly Curved Arteries from a Single Velocity Profile", Journal of Biomechanics, 2009, pp. 1664-1672.
Lombardi et al., "Flow Rate Profiler: an instrument to measure blood velocity profiles", Ultrasonics, 2001, vol. 39, pp. 143-150.
Mushi et al., "Identification of Fluidic Element Models to Simulate the Short-Term Baroreflex", Proceedings of the 45th IEEE Conference on Decision & Control, San Diego, CA, Dec. 13-15, 2006, pp. 6.
Sinha et al., "Effect of Mechanical Assistance of the Systemic Ventricle in Single Ventricle Circulation with Cavopulmonary Connection", The Journal of Throacic and Cardiovascular Surgery, Apr. 2014, vol. 147, No. 4, pp. 1271-1275.
"Understanding Hot-Wire Anemometry", Advanced Thermal Solutions, Inc., 2007, pp. 13-17.
Vieli, A., "Doppler Flow Determination", BJA: British Journal of Anaesthesia, 1988, vol. 60, pp. 107S-112S.
Yuanyuan et al., "Characteristics Analysis for Doppler Ultrasound Blood Flow Signals", China Medical Device Information, 5(1), Feb. 28, 1999, pp. 36-42.
Zhang, Dabiao et al., "Design of Microwave Velocity and Distance Monitor System", Instrument Technique and Sensor, Hebei Normal University, Apr. 25, 2004, pp. 3.
Murali, Akila, "Design of Inductive Coils for Wireless Power Transfer to Pediatric Implants", A graduate project submitted in partial fulfillment of the requirements for the degree of Master of Science in Electrical Engineering, California State University, Northridge, May 2018, pp. 37.
HeartMate 3™ Left Ventricular Assist System, Instructions for Use, Thoratec Corporation, Aug. 2017, pp. 536. [Uploaded in 3 parts].
Chung et al., "Improved Efficiency Characteristics of Wireless Power Charging System for Superconducting MAGLEV Train Using Inserted Permanent Magnets," 2018 IEEE International Symposium on Electromagnetic Compatibility, 2018, pp. 564-567.
"ECG Electrodes product comparison chart," 3M.com, 2018, https://multimedia.3m.com/mws/media/14908830/red-dot-ecg-electrodes-comparison-chart.pdf, accessed May 18, 2025, 1 page.
Eeckhout, Md, PhD, et al., "Handbook of Complications During Percutaneous Cardiovascular Interventions", 2007 Informa UK Ltd., Ch. 12, pp. 167-177.
Mack-Haynes, Robin, "Fasteners Made Easy," New Mexico State University, https://pubs.nmsu.edu/_c/C232.pdf, accessed May 18, 2025, pp. 8.
Mullins, Charles E., MD, "Cardiac Catheterization in Congenital Heart Disease: Pediatric and Adult", Blackwell Futura, 2006, Chapters 3, 4 and 32, pp. 101.
Sigg et al., "Cardiac Electophysiology Methods and Models", Springer, Clinical Perspective: Electrophysiology in the Young and Patients with Congenital Heart Disease, Ch. 23, 2010, pp. 457-477.
Tan et al., "Surface Engineering and Patterning Using Parylene for Biological Applications." Materials, Mar. 15, 2010, vol. 3, No. 3, pp. 1803-1832.

* cited by examiner

SYSTEMS AND METHODS FOR DETERMINING A BLOOD VOLUME FLOW THROUGH A CARDIAC SUPPORT SYSTEM AND VASCULAR SUPPORT SYSTEM

BACKGROUND

Field

The invention relates to a method for determining a fluid volume flow through an implanted vascular support system, a processing unit, and an implantable vascular support system. The invention is in particular used in (fully) implanted left-heart support systems (LVAD).

Description of the Related Art

Implanted left-heart support systems (LVAD) mainly exist in two design variants. (Percutaneous) minimally invasive left-heart support systems constitute a first common design variant. Apical left-heart support systems invasively implanted under the chest opening constitute the second common design variant. In the first variant mentioned, blood is conveyed directly from the left ventricle into the aorta since the (percutaneous) minimally invasive left-heart support system is positioned centrally in the aortic valve. In the second variant mentioned, the blood is apically conveyed from the left ventricle via a bypass tube into the aorta.

The task of a cardiac support system is to convey blood. In this case, the so-called heart-time volume (HTV, usually indicated in liters per minute) is highly clinically relevant. In other words, the heart-time volume in this case relates to the total volume flow of blood (from a ventricle), in particular from the left ventricle, to the aorta. Correspondingly clear is the attempt to collect this parameter as a measured value during operation of a cardiac support system.

Depending on the level of support, which describes the proportion of volume flow conveyed by a conveying means, such as a pump of the support system, to the total volume flow of blood from the ventricle to the aorta, a certain volume flow reaches the aorta via the physiological path through the aortic valve. The heart-time volume or the total volume flow ($Q_{HTV}$) from the ventricle to the aorta is therefore usually the sum of the pump volume flow ($Q_p$) and the aortic valve volume flow ($Q_a$). This can be expressed with the following relationship:

$$Q_{HTV} = Q_p + Q_a$$

An established method for the determination of the heart-time volume ($Q_{HTV}$) in the clinical setting is the use of dilution methods, which, however, all rely on a catheter inserted transcutaneously and therefore can only provide heart-time volume measurement data during cardiac surgery. Since the detection of the heart-time volume ($Q_{HTV}$) through an LVAD is difficult to implement, $Q_p$ can be detected by suitable components of the LVAD. For high levels of support (i.e., $Q_p/Q_{HTV}$), $Q_a$ approaches zero so that $Q_p$ can approximately be used as the heart-time volume ($Q_{HTV}$).

An established method for measuring the pump volume flow ($Q_p$) is the correlation of the operating parameters of the support system, predominantly the electrical power consumption, possibly supplemented by further physiological parameters, such as blood pressure. Since these methods are based on statistical assumptions and the underlying pump characteristic map of the LVAD used, the correlated $Q_p$ are error-prone. In order to increase the measurement quality of the parameter $Q_p$, the inclusion of a flow sensor is therefore desirable.

SUMMARY

The object of the invention is to specify an improved method for determining a fluid volume flow in the region of an implanted vascular support system and to create an improved implantable vascular support system.

In particular, it is an object of the invention to specify a method for determining a fluid volume flow in the region of an implanted vascular support system and to create an implantable vascular support system by means of which a fluid volume flow in a blood flow region can be determined in a human or animal body, in which the vascular support system is implanted or arranged.

According to claim 1, a method for determining a fluid volume flow through an implanted vascular support system is proposed here, comprising the following steps:
  a) determining a fluid temperature parameter in the region of a cannula of the support system,
  b) operating a heating element which can bring about a change in a fluid temperature in the cannula,
  c) determining the fluid volume flow using at least the fluid temperature parameter or the change thereof and at least one heating element operating parameter or the change thereof.

The vascular support system is preferably a cardiac support system, particularly preferably a ventricular support system. The method preferably serves to determine a fluid volume flow through a blood vessel or through a cross-section of the blood vessel. The blood vessel is, for example, the aorta, in particular in the case of a left-heart support system, or the common trunk (Truncus pulmonalis) into the two pulmonary arteries, in particular in the case of a right-heart support system, preferably the aorta. The method preferably serves to determine a fluid volume flow from a ventricle of a heart, in particular from a (left) ventricle of a heart to the aorta by a (fully) implanted, (left) ventricular (heart) support system. The fluid is regularly blood. The support system is preferably arranged at the exit of the left ventricle of the heart or the left heart chamber. The support system is particularly preferably arranged in the aortic valve position.

The support system is preferably implanted such that it is located in the fluid flow at least partially, preferably completely, or with at least 50%, particularly preferably at least 85%, or even at least 95% of its (outer) surface. Furthermore, the support system is preferably located along at least 50%, particularly preferably at least 85%, or even at least 95% of its length in the fluid flow. One end of the support system, in the region of which or on which the electric motor is located, is preferably located at least partially in the aorta. Furthermore, the opposite end of the support system, in the region of which or on which an (inlet) cannula of the support system is located, is preferably located at least partially in a ventricle (the left ventricle) of the heart. Furthermore, the support system is preferably positioned centrally in the aortic valve so that blood is drawn distally from the ventricle and dispensed proximally into the Aorta ascendens. Preferably, the support system is arranged in a blood vessel, such as an artery, in particular the aorta, at least partially, preferably completely, or with at least 20%, preferably at least 40%, particularly preferably at least 50%, or even at least 95% of its (outer) surface. The support system is particularly preferably implanted such that it is (completely) located in the (ascending or descending) aorta.

The fluid volume flow to be determined is the one that flows through the support system (itself). In other words, this relates in particular to a fluid volume flow that only flows through the support system itself. The fluid volume flow to be determined is usually the so-called pump volume flow (formula symbol $Q_p$), which (only) quantifies the flow through the support system itself. The method is in particular suitable for determining the pump volume flow ($Q_p$) of a (fully) implanted (left) ventricular heart support system (LVAD), in particular in the aortic valve position and/or by the support system itself.

The method is based in particular on (thermally) anemometric (measuring) principles for flow measurement. The basic principle in this case is that a flowing medium cools a hot body as a function of the flow rate. The method advantageously allows a continuous, precise measurement of $Q_p$ by a sensor element which is integrated into an LVAD and based on thermal anemometry. With the solution presented here, the heart-time volume (at least approximately through $Q_p$) can also advantageously be provided outside the surgical scenario with comparable quality as when using a dilution catheter.

The solution proposed here is characterized in particular by an integration of one or more heating elements or one or more heating elements and one or more temperature sensors into an inlet cannula of a support system (VAD). In the method, $Q_p$ is advantageously calculated from the measured voltage data of at least one heating element and/or of at least one temperature sensor. In particular, three possible operating principles can be used in this case, a constant current anemometry, a constant temperature anemometry, or a pulse response method.

In step a) a fluid temperature parameter in the region of a cannula of the support system is determined. A (separate) temperature sensor can, for example, be used for the determination. The determination can alternatively or cumulatively take place by the heating element itself. For example, an electrical series resistance of the heating element can be used for this purpose. The fluid temperature parameter can be a (fluid) temperature, a temperature sensor current, a temperature sensor output (current) signal, or a (temperature-dependent) electrical resistance value, in particular of the heating element.

In step a), a temperature sensor in the region of a cannula of the support system is operated. The operation comprises in particular measuring a fluid temperature and/or changing the fluid temperature. The temperature sensor is preferably arranged on an inner surface or an outer surface of the cannula. Furthermore, at least two temperature sensors can preferably be provided. In this case, a temperature sensor can be arranged upstream of the heating element and a further temperature sensor can be arranged downstream of the heating element.

The cannula is in particular an inlet cannula, which can also be referred to as a suction tube. The (inlet) cannula is preferably configured such that, in the implanted state, it can guide fluid from a (left) ventricle of a heart to a flow machine of the support system and/or to the aorta.

The temperature sensor or the temperature sensors is/are particularly preferably arranged at a distance from the heating element. This allows the advantage that the temperature sensor is not thermally influenced by the heating element, which is in particular advantageous if the temperature sensor is a reference temperature sensor. NTC thermistors, PTC thermistors, resistance elements such as platinum, semiconductor junctions, or thermocouples can be used as temperature sensors.

The temperature sensor or a further temperature sensor can be introduced into the heating element or arranged on the heating element. If at least two temperature sensors are provided, it is preferred in this case that a reference temperature sensor is arranged at a distance from the heating element and a further temperature sensor is introduced into the heating element or arranged on the heating element. If only one temperature sensor is provided, it may be necessary that the heating element is switched off or not operated in a heating state during a measurement of a reference temperature by the temperature sensor. Positioning a flat temperature sensor between the cannula inner wall and the heating element or positioning a temperature sensor on the heating element is preferred. A particularly preferred implementation is a central positioning of the temperature sensor in the heating area of the heating element. A possible form of implementation would also be a three-layer structure, wherein a heating coil is positioned as a temperature sensor between a lower and a middle polyimide film and a platinum wire coil is positioned as a temperature sensor between the middle and an upper polyimide film.

A reference temperature of the fluid is preferably determined, in particular measured, in step a). The reference temperature is preferably determined by a reference temperature sensor, which is particularly preferably a component of the support system. The reference temperature sensor can, for example, be arranged in and/or on an (inlet) cannula of the support system. The reference temperature usually represents a background temperature of the fluid, in other words a fluid temperature, which is in particular not thermally influenced by the heating element and/or a flow machine of the support system.

In step b), a heating element which can bring about a change in a fluid temperature in the cannula is operated. In other words, this means in particular that the heating element is configured and arranged such that it can cause a change in a fluid temperature in the cannula. For this purpose, the heating element can be arranged directly inside the cannula or on an inner surface of the cannula. However, it is (alternatively) possible that the heating element is arranged in a wall of the cannula, on an outer surface of the cannula, or even at a distance from the cannula, as long as the heating element is able, for example, by means of heat conduction, to increase a fluid temperature of at least a part of the fluid inside the cannula. For operation, the heating element is generally controlled with a current.

The heating element is preferably formed with at least one heating filament or thermofilament. A heating element, in particular a round or tubular heating element, which coats the inner surface of the cannula at least in a segment region or circumferential portion and/or longitudinal portion is preferably provided. Furthermore, the heating element is preferably formed in the manner of a (flexible) heating film which at least partially coats the inner surface of the cannula. At least one heating filament is particularly preferably arranged in or on the film. Preferably, the heating filament extends (e.g., in a meandering pattern and/or in loops) in particular continuously over at least 50% of or even over the (entire) inner surface of the cannula coated by the film. At least two heating filaments may be provided. It is preferred that the heating filament or thermofilament is implemented on the wall inside the cannula (on the inside of the cannula wall), whereby a defined blood volume is advantageously investigated and heating, e.g., of the aortic valve when the support system slips can be ruled out. If more than one heating element or heating filament is provided, they can be arranged at opposite positions of the inner surface of the cannula. The heating elements or heating filaments are furthermore preferably jointly actuated or energized.

It is also advantageous if the heating element itself is used as a temperature sensor. The heating element is preferably configured both to bring about a change in a fluid temperature in the cannula and to detect, in particular measure, a change in a fluid temperature in the cannula. The heating element itself can be used as a temperature sensor, in particular by a suitable selection of the heating element, in particular the heating filament material (resistance change in case of temperature change). An advantageous embodiment of the heating element is therefore, for example, a (platinum) wire coil (heating filament made of a platinum alloy and arranged in a meandering pattern) between, for example, polyimide films or on a film. Preferably, the heating element comprises heating coils produced in the thin-film process from conductive, resistive materials (e.g., platinum alloy). In this case, the heating element can be used, for example, as a temperature sensor in that a heating element (series) resistance is measured. In order to measure the reference temperature or the fluid background temperature, the heating element (series) resistance can be measured, for example, with the heater switched off or in a phase in which the heating element is not operated in a heating state (e.g., as determined by means of a heating voltage and/or a heating current). If the heating element itself can be used as a temperature sensor, no (further or separate) temperature sensor must be provided and the heating element can in this case be operated in step a) instead of the (separate) temperature sensor. In this context, it is particularly preferred that (only) one (platinum) heating coil which can also be used as a temperature sensor is used as the heating element or in the heating element. In the switched-off state, i.e., when the heating element is not operated in a heating state, the (platinum) heating element or the heating coil could be used as a reference temperature sensor; during operation, i.e., when the heating element is operated in a heating state, it could be used as a heating element and simultaneously as an operating temperature sensor. For this purpose, a (known) temperature dependence of a heating element (series) resistance can be used, for example.

The heating element in this case is a component regularly provided in addition to an electric motor of the support system, which is in particular arranged separately from the electric motor. A heating element in this case is in particular understood to mean an electrically operable component, which preferably converts at least 70%, particularly preferably at least 80%, or even at least 90% of the electrical energy supplied to it into heat. Consequently, a heating element in this case in particular does not mean an electric motor that drives a flow machine of the support system.

In step c), the fluid volume flow is determined using at least the fluid temperature parameter or the change thereof and at least one heating element operating parameter or the change thereof. In step c), the fluid volume flow is preferably determined using at least one temperature sensor operating parameter or the change thereof and at least one heating element operating parameter or the change thereof. In other words, this means, in particular, that the fluid volume flow is determined using both a temperature sensor operating parameter or the change thereof and a heating element operating parameter or the change thereof. A heating element operating parameter can, for example, be understood to be a heating element temperature, a heating element current, or a heating element output (current) signal. A temperature sensor operating parameter can be understood to mean a temperature measured therewith, a temperature sensor current, or a temperature sensor output (current) signal. Here, a change can in particular be understood to mean a pulse, which can advantageously be transmitted by the heating element and detected by the temperature sensor.

According to a (first) advantageous embodiment, it is proposed that the heating element be operated with a defined electrical power. A temperature of the heating element can be measured in this case. This (first) embodiment relates in particular to so-called constant current anemometry. In constant current anemometry, the heating element is operated with a defined electrical power and the resulting temperature is measured.

According to a (second) advantageous embodiment, it is proposed that the heating element be kept at a constant temperature. An electrical power of the heating element can be measured in this case. This (second) embodiment relates in particular to so-called constant temperature anemometry. In constant temperature anemometry, the heating element is kept at a constant temperature and the electrical power required for this purpose is measured.

According to a (third) advantageous embodiment, it is proposed that the heating element be operated in a pulsed manner. In this case, in step c), a change in a fluid temperature can be detected by means of a temperature sensor positioned in particular downstream of the heating element. This (third) embodiment relates in particular to a so-called pulse response method. In the pulse response method, the heating element is operated in a pulsed manner and the time is measured until the thermal pulse is measured at a downstream temperature sensor. In order to improve the measurement resolution, the pulsed operation can be carried out, for example, by means of a binary random number sequence and the time delay can be determined by an autocorrelator. Furthermore, an additional consideration of the maximum amplitude of the response pulse in the calculation is preferred.

The fluid volume flow determined in step c) is preferably provided, for example, in a step d) as a control parameter for the support system. A processing unit of the support system can provide this control parameter as an output variable, in particular to a control unit of the support system that preferably regulates the power of an electric motor and thus in particular also the (blood) delivery rate of the support system.

A further aspect proposes a processing unit configured to carry out a method proposed here. The processing unit can have a memory in which calibration data can be stored. As an alternative or in addition to the calibration data, at least one (speed-dependent) calibration factor and/or a thermal model of the heating element can also be stored in the memory. In addition, the processing unit can comprise a microprocessor which can access the memory. The processing unit preferably receives data from at least one heating element and/or at least one temperature sensor. The processing unit can furthermore comprise an electronic assembly for controlling and reading the heating element and the temperature sensor.

According to a further aspect, an implantable, vascular support system is proposed, comprising:
  a temperature measuring device in the region of a cannula of the support system,
  a heating element which can bring about a change in a fluid temperature in the cannula.

The support system is preferably a left-ventricular heart support system (LVAD) or a percutaneous, minimally invasive left-heart support system. Furthermore, the support system is preferably fully implantable. In other words, this means in particular that the means required for the detection, in particular the reference temperature sensor, the motor temperature sensor, and the current sensor, are completely located in the body of the patient and remain there. The support system is particularly preferably configured and/or suitable for being arranged at least partially in a ventricle, preferably in the left ventricle of a heart, and/or in an aorta, in particular in the aortic valve position.

The temperature measuring device is preferably formed with a temperature sensor. The temperature measuring device can furthermore preferably also comprise a further temperature sensor. However, it is not mandatory that the temperature measuring device is provided separately from the heating element. Rather, the temperature measuring device can also be formed in the heating element and/or by the heating element itself. An (implicit) temperature measurement based on a heating element series resistance is particularly preferred for this purpose.

Furthermore, the support system preferably comprises a flow machine, such as a pump. The support system preferably has an electric motor. The electric motor is regularly a component of the flow machine. The support system is preferably elongated and/or tubular. Preferably, a(n) (inlet) cannula and a flow machine are arranged in the region of opposite ends of the support system.

According to an advantageous embodiment, the support system furthermore comprises a processing unit configured for carrying out a method proposed here.

The details, features, and advantageous embodiments discussed in connection with the method can also arise accordingly in the processing unit and/or the support system presented here and vice versa. In this respect, reference is made in full to the explanations there regarding the detailed characterization of the features.

BRIEF DESCRIPTION OF THE DRAWINGS

The solution presented here as well as its technical environment are explained in more detail below with reference to the figures. It should be pointed out that the invention should not be limited by the exemplary embodiments shown. In particular, unless explicitly stated otherwise, it is also possible to extract partial aspects of the facts explained in the figures and to combine them with other components and/or insights from other figures and/or the present description. The following are shown schematically.

DETAILED DESCRIPTION

Figure 1A:
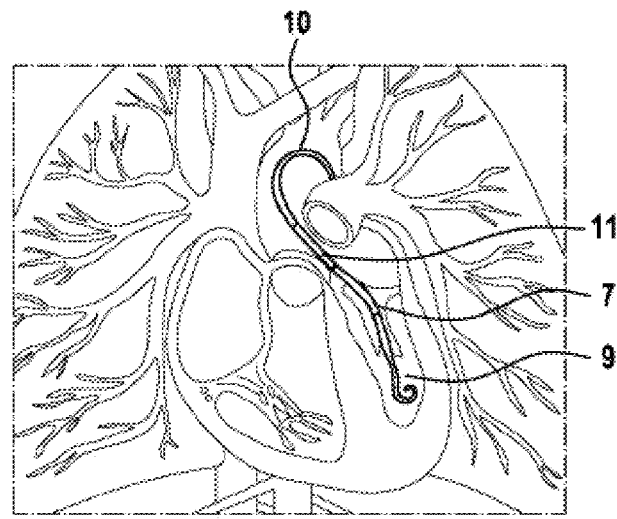
FIG. 1a a percutaneous, minimally invasive left-heart support system.
Figure 1B:
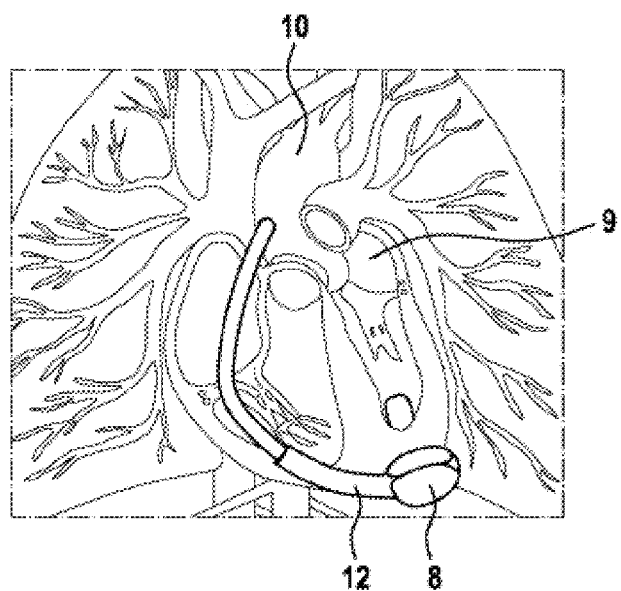
FIG. 1b a left-heart support system invasively implanted under the chest opening, FIG. 2 an implanted vascular support system that can carry out a constant current and constant temperature method, FIG. 3 a component architecture of a support system according to FIG. 2, FIG. 4 an illustration of a control circuit of a support system according to FIG. 2, FIG. 5 a further implanted vascular support system that can carry out a constant current and constant temperature method, FIG. 6 a further implanted vascular support system that can carry out a pulse response method, FIG. 7 a further implanted vascular support system that can carry out a pulse response method, and FIG. 8 measured value time curves for the support system according to FIG. 6 or FIG. 7.

Implanted left-heart support systems (LVAD) exist mainly in two design variants, as shown in FIGS. 1a and 1b. FIG. 1a shows a (percutaneous) minimally invasive left-heart support system 7, while FIG. 1b shows an apical left-heart support system 8 invasively implanted under the chest opening. The variant according to FIG. 1a conveys blood directly from the left ventricle 9 into the aorta 10, since the (percutaneous) minimally invasive left-heart support system 7 is positioned centrally in the aortic valve 11. The variant according to FIG. 1b conveys the blood apically from the left ventricle 9 via a bypass tube 12 into the aorta 10.

Figure 2:
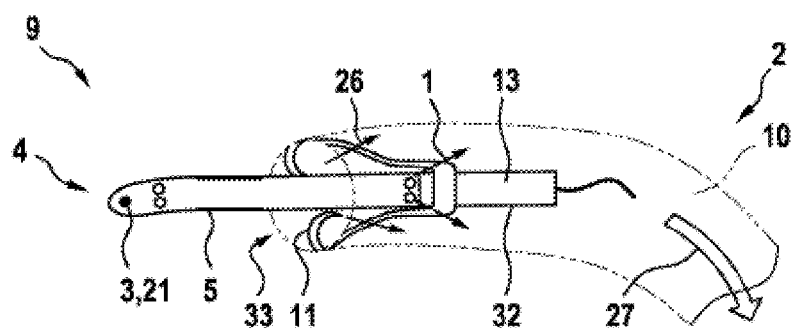

FIG. 2 schematically shows, in the aortic valve position, an implanted vascular support system 2 that can carry out a constant current and constant temperature method.

The support system 2 is here, by way of example, a left ventricular heart support system (LVAD), a tubular elongated structure with a cannula portion, in which a(n) (inlet) cannula 4 is formed, and with a flow machine portion which is connected to the cannula portion and in which a flow machine 32 is arranged. The support system 2 protrudes from the aorta 10 through the aortic valves 11 distally into the ventricle 9. The (inlet) cannula 4 of the support system 2 protrudes into the ventricle 9. A fluid volume flow 1 is conveyed, for example pumped, from the ventricle 9 through the cannula 4 into the aorta 10 using the flow machine 32 (e.g., a pump that can have an electric motor) of the support system 2. Therefore, the fluid volume flow 1 is also referred to as the pump volume flow ($Q_p$), which only quantifies the flow through the support system 2 itself.

In addition, it can be seen in FIG. 2 that a certain aortic valve volume flow 26 reaches the aorta 10 via the physiological path through the aortic valves 11. The heart-time volume or the total fluid volume flow 27 ($Q_{HTV}$) passing through a cross-sectional geometry 33 of the aorta 10 in the region of the support system 2 from the ventricle 9 to the aorta 10 is therefore the sum of fluid volume flow 1 ($Q_p$) and aortic valve volume flow 26 ($Q_a$).

A temperature sensor 3 is arranged in the region of the cannula 4. For this purpose, the temperature sensor 3 is positioned, by way of example, on the distal end of the cannula 4 (in the ventricle 9, from where the fluid, e.g., blood, flows). The support system 2 furthermore comprises a heating element 5 which can bring about a change in a fluid temperature in the cannula 4, e.g., by Joule heating or ohmic resistance heating, when the heating element 5 is energized.

The temperature sensor 3 according to FIG. 2 is a reference temperature sensor, which detects a reference temperature 21, which, by way of example, is in this case the background blood temperature. For this purpose, the (reference) temperature sensor 3 is positioned in the thermally uninfluenced blood flow upstream of the heating element 5, which represents a heat source, here by way of example in the region before or upstream of the heating element 5. Instead of a separate (reference) temperature sensor 3, the value of a further (second) temperature sensor arranged, for example, at the height of the heating element 5 or downstream thereof (cf. FIGS. 5, 6: reference sign 24; FIG. 7: reference sign 3) can also be used if the system is not in operation and this further temperature sensor is thus not influenced by the heating element 5. Since the blood temperature changes only slowly in resting patients, this value can also represent a good estimation of the background temperature. In addition, depending on the design of the heating element 5, the electrical resistance of the heating element 5 itself can also be used as a temperature sensor 3.

If a separate reference temperature sensor is used, as is the case with the temperature sensor 3 according to the illustration in FIG. 2, this separate reference temperature sensor should be positioned in the support system 2 in such a way that it is not influenced by the thermal output of the heating element 5, e.g., at the tip of the support system 2 pointing toward the ventricle 9 and/or the cannula 4 and/or in a thermally decoupled manner upstream (with respect to the blood flow) of the heating element 5. As a result, it is advantageously possible to determine the temperature rise by thermal energy supply into the observed fluid volume. Due to the directed flow in the medium, an exemplary minimum distance of the reference temperature sensor to the heating element 5 is determined in particular (mainly) from the thermal conductivity of the carrier material. Distances of at least 5 mm [millimeters] are advantageous for non-metallic carrier material.

The operating principle here is based on sufficiently knowing the thermal capacity (formula symbol C; cf. reference sign 23 in FIG. 4) of the fluid, in this case blood, and on determining the electrical power dQ necessary to heat the blood by a defined temperature dT:

$$C = \frac{dQ}{dT}$$

With a sufficiently known thermal capacity C (provided in the algorithm), measured energy supply dQ, and temperature rise dT determined from two measured (fluid) temperatures, the fluid volume V or the fluid volume flow 1 (formula symbol Q) transferred in the observational period can thus be calculated. The background blood temperature required for the difference dT can in this case be calculated either by means of a (reference) temperature sensor 3 or from the value of a further temperature sensor (cf. explanations above) if the heating element was not active for a sufficiently long time.

The heating element 5 is in this case formed, by way of example, with a heating filament or thermofilament. The thermofilament is implemented on the wall inside the cannula 4, which can also be referred to as a suction tube, as a result of which a defined blood volume is advantageously investigated and heating, e.g., of the aortic valve 11 when the support system slips can be ruled out.

Figure 4:
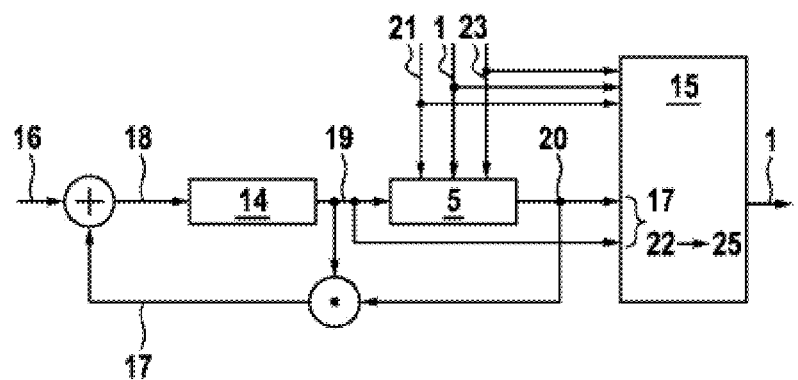

Regarding the operating mode of the embodiment according to FIG. 2, reference is also made to the following explanations regarding FIG. 4.

Figure 3:
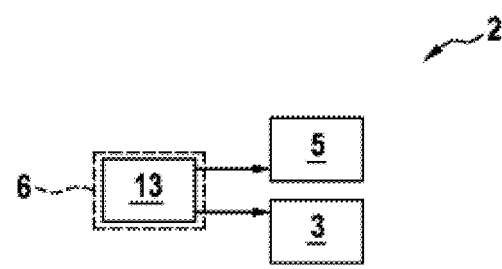

FIG. 3 schematically shows a component architecture of a support system according to FIG. 2. In this case, the support system 2 comprises, by way of example, a control unit 13, a temperature sensor 3, and a heating element 5 formed, by way of example, as a thermofilament or heating filament. By way of example, the control unit 13 is here a component of a processing unit 6 of the support system 2.

FIG. 4 schematically shows an illustration of a control circuit of a support system 2 according to FIG. 2. The reference signs are used uniformly so that reference is also made to FIGS. 2 and 3 with respect to the explanation of the operating mode of the embodiment according to FIGS. 2 to 4.

The exemplary control circuit shown in FIG. 4 can be implemented in the control unit 13 according to FIG. 3, which in turn can be a component of the support system 2, in particular of a processing unit 6 of the support system 2. The control circuit comprises a controller 14 and the heating element 5. The disturbance variables influencing the heating element 5 (control path) are the reference temperature 21, the fluid volume flow 1, and the thermal capacity 23 (of the fluid, here blood). The control variable here is the current 20 and is returned to the controller 14. Here, the current 20 (control variable) and the voltage 19 (manipulated variable) are returned together by means of the determined actual power 17. The control deviation 18 results from a subtraction of the actual power 17 from the target power 16. The aforementioned disturbance variables of fluid volume flow 1, reference temperature 21, and thermal capacity 23 as well as the current 20 (control variable) and the voltage 19 (manipulated variable) are also provided to a computing unit 15, which determines the actual power 17 from the voltage 19 and the current 20 as well as the actual electrical resistance 22 of the heating element 5 and also determines the heating element temperature 25 from the actual electrical resistance 22 (e.g., based on the known temperature dependence of the resistance). The computing unit 15 calculates therefrom the fluid volume flow 1, wherein the latter can be provided as an average volume flow.

In the embodiment as constant current anemometry, the heating element 5 is here, by way of example, supplied with constant power by the controller 14 in the control unit 13 and both the electrical resistance 22 for measuring the heating element temperature 25 and the reference temperature 21 is read from the reference temperature sensor 3 (or heating element resistance 22 when the heater is switched off (i.e., the heating element 5 is not operated in a heating state) in order to determine the reference temperature 21). The fluid volume flow 1 or of $Q_p$ is calculated in the computing unit 15 on the basis of the electrical heating element power consumption 17, the heating element temperature 25 determined on the basis of the electrical resistance 22 of the heating element 5, and the reference temperature 21.

In the embodiment as constant temperature anemometry, the heating element temperature 25 of the heating element 5 is here, by way of example, kept at a defined temperature by the controller 14 or at a defined temperature rise based on the reference or background temperature 21. On the basis of the required filament power consumption 17 and the background temperature 21, the fluid volume flow 1 or $Q_p$ is calculated in the computing unit 15 of the control unit 13.

Figure 5:
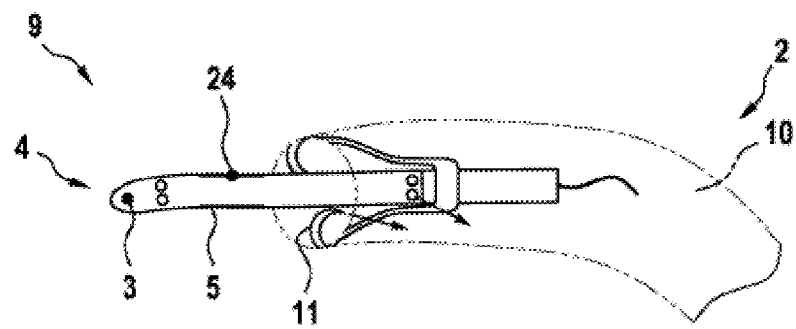

FIG. 5 schematically shows a further implanted, vascular support system 2, which can carry out a constant current and constant temperature method. The support system 2 according to FIG. 5 has many common features with the support system 2 according to FIG. 2, so that reference is made in this respect to the above explanations regarding FIG. 2. The design variant according to FIG. 5 differs from that according to FIG. 2 in that a further (second) temperature sensor 24 is positioned so as to be thermally coupled to the heating element 5 so that the temperature of the heating element 5 can be determined not based on the electrical resistance 22 of the heating element 5, but based on the electrical resistance of the additional temperature sensor 24.

Figure 6:
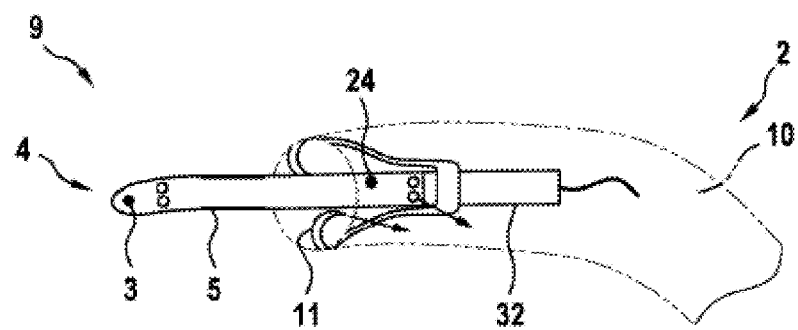
Figure 7:
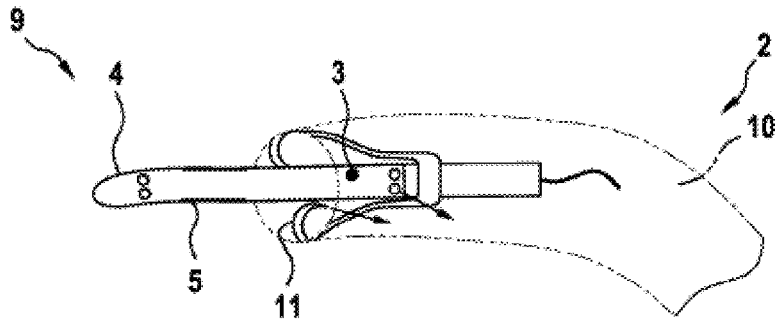

FIG. 6 schematically shows a further implanted, vascular support system 2, which can carry out a pulse response method. In this variant, a further temperature sensor 24 arranged preferably on the wall inside the cannula 4 is spaced apart from the heating element 5 (in the direction of the flow machine 32, downstream of the heating element 5)

so that transit time and thermal dilution effects can be observed. As with the design variants described above, an optional (cf. FIG. 7) reference temperature sensor, which is formed here by the temperature sensor 3, is positioned upstream in order to determine the reference or background temperature 21 of the fluid (here: blood). In this case, it is ensured that the temperature sensor 3 and the additional temperature sensor 24 are thermally decoupled from the heating element 5 and that the further temperature sensor 24, due to its spatial proximity to the flow machine 32, is also thermally decoupled therefrom. Depending on the carrier material, a distance of 5-10 mm is good in this case.

The heating element 5 is subjected to a power pulse 31 and introduces a defined amount of energy $E_p$ into the blood volume of the cannula 4, which leads to an increase in the blood temperature. Due to the (pump) activity of the flow machine 32, the blood flows with a $Q_p$-dependent flow rate further in the direction of the further temperature sensor 24, which observes a temperature maximum $T_m$ after a $Q_p$-dependent transit time $\Delta t$. On the basis of $E_p$ or the heating element power consumption 17, with $\Delta t$, the reference temperature 21, and $T_m$, the fluid volume flow 1 or $Q_p$ is calculated in the control unit 13 (transit time $\Delta t$ or transit time $\Delta t$ and amplitude height $T_m$).

The observable effects are both a transit time, wherein a high fluid volume flow 1 corresponds to a short transit time from the heating element 5 to the further temperature sensor 24, and, based on the fixed thermal resistance of the heating element 5 to the blood volume and the fixed thermal capacity 23 of the blood, an amplitude change, wherein a slow fluid volume flow 1 corresponds to a sharp temperature increase at the further temperature sensor 24 and a fast flow corresponds to a small temperature increase.

FIG. 7 schematically shows a further implanted, vascular support system 2, which can carry out a pulse response method. The support system 2 according to FIG. 7 has many common features with the support system 2 according to FIG. 6 so that reference is made in this respect to the above explanations regarding FIG. 6. The difference is that only one temperature sensor 3 is provided in FIG. 7. This temperature sensor is preferably on the wall inside the cannula 4 and in this case fulfills the purpose which the further temperature sensor 24 fulfills in the embodiment according to FIG. 6. The embodiment according to FIG. 7 thus manages without a (separate) reference temperature sensor.

Figure 8:
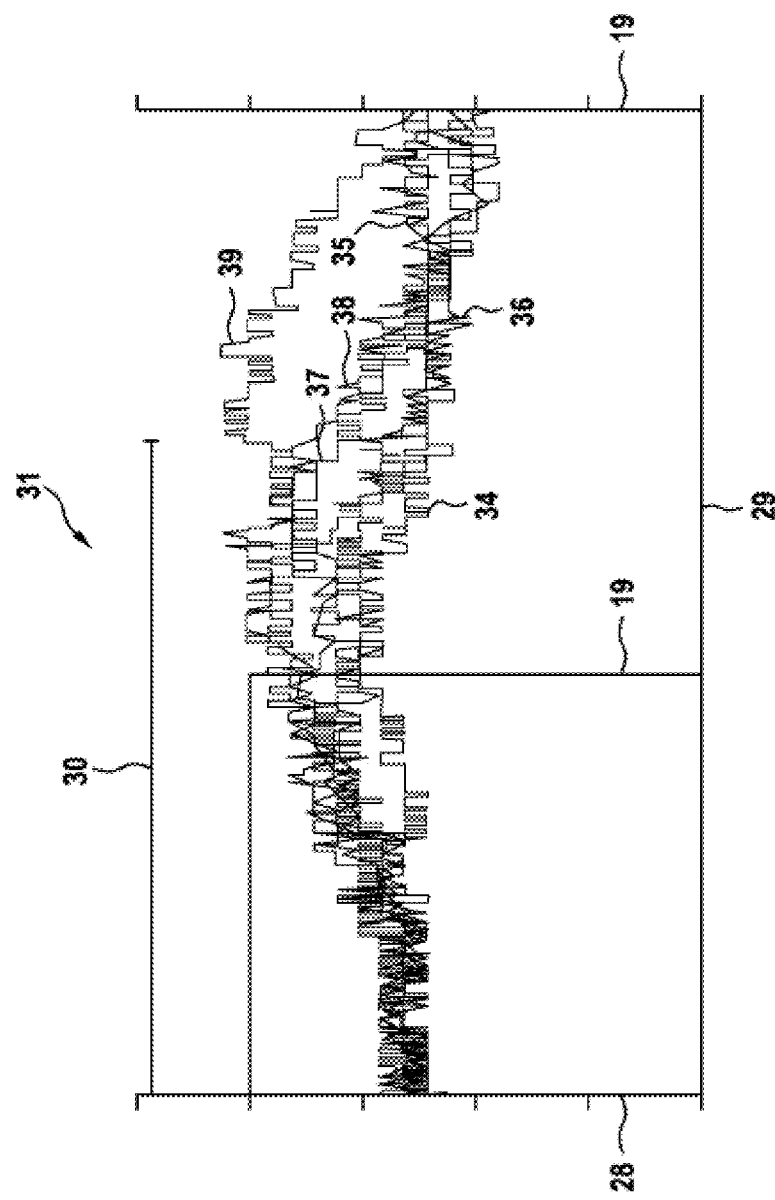

FIG. 8 shows schematically measured value time curves for the support system 2 according to FIG. 6 or FIG. 7. Temperature curves measured by means of the temperature sensor arranged downstream of the heating element 5 (reference sign 24 in FIG. 6 and reference sign 3 in FIG. 7) are plotted over the time 29, wherein the temperature was measured as a voltage value via an analog/digital converter so that both the voltage 19 and an analog/digital converter output 28 are plotted over the time 29. Various measured value curves are plotted, namely a first measured value curve 34, a second measured value curve 35, a third measured value curve 36, a fourth measured value curve 37, a fifth measured value curve 38, and a sixth measured value curve 39, wherein the measured value curves are arranged according to decreasing fluid volume flow (pump volume flow); measured value curve 39 thus represents the temperature curve at the temperature sensor in the case of a low fluid volume flow and measured value curve 34 thus represents the temperature curve at the temperature sensor in the case of a high fluid volume flow. In addition, the time difference 30 until the pulse 31 of the measured value curve 39 was measured is marked only as an example. It can be clearly seen that the time difference 30 is inversely proportional to the fluid volume flow, as is the amplitude (the maximum) of the measured value curve. In addition, in the illustration according to FIG. 8, the pulses 31 of the further measured value curves 34, 35, 36, 37, and 38 can also be seen, thus a total of six pulses 31. For the explanation of the measured value curves, reference is made to the above explanations regarding FIGS. 6 and 7, in particular to the observed effects described there.

The solution proposed here allows in particular one or more of the following advantages:

By integrating the sensor into the inlet cannula of the VAD, contact between the tissue and the heating element is prevented, thereby preventing tissue damage.

The integration into the inlet cannula has the advantage that the (flow) geometry and thus the investigated blood volume is known, which simplifies or replaces the calibration of the sensor depending on the implementation variant. Commercially available catheters require the administration of an ice-water bolus in order to calibrate with respect to the blood vessel volume.

Continuous $Q_p$ measurement allows rapid diagnosis of suction, i.e., suction of the inlet tube to the ventricle wall, whereby the pump function is impaired.

In summary, the following preferred features of the invention should in particular be noted:

A method for determining a fluid volume flow 1 through an implanted vascular support system 2 comprises the following steps:

a) determining a fluid temperature parameter in the region of a cannula (4) of the support system (2), b) operating a heating element (5) which can bring about a change in a fluid temperature in the cannula (4), c) determining the fluid volume flow (1) using at least the fluid temperature parameter or the change thereof and at least one heating element operating parameter or the change thereof.

An implantable vascular support system, i.e., a vascular support system that can be arranged in the human or animal body, contains a temperature measuring device in the region of a cannula 4 of the support system 2 and comprises a heating element 5 which can bring about a change in a fluid temperature in the cannula (4).

The invention claimed is:

1. A method for determining a blood volume flow through a cardiac support system, the method comprising:
   conveying blood with a flow machine through a cannula;
   determining a blood temperature parameter of the blood conveyed through the cannula by a temperature sensor located at an inlet of the cannula,
   operating a heating element located downstream of the temperature sensor to change a blood temperature of the blood located in the cannula downstream of the temperature sensor and upstream of the flow machine, and
   determining the blood volume flow based on 1) the blood temperature parameter or a change thereof and 2) a heating element operating parameter or a change thereof.

2. The method according to claim 1, wherein the heating element operating parameter comprises an electrical power of the heating element.

3. The method according to claim 1, wherein the heating element operating parameter comprises a temperature of the heating element.

4. The method according to claim 1, wherein the heating element is kept at a constant temperature and the heating element operating parameter comprises an electrical power of the heating element.

5. The method according to claim 1, wherein the heating element is located on an inner wall of the cannula.

6. The method according to claim 1, wherein the heating element is operated in a pulsed manner.

7. The method according to claim 1, wherein the temperature sensor comprises a first temperature sensor and wherein determining a blood temperature parameter comprises determining a change in the blood temperature using the first temperature sensor and a second temperature sensor, the second temperature sensor located downstream of the heating element.

8. The method of claim 1, wherein the temperature sensor is at least 5 mm upstream of the heating element.

9. The method of claim 1, wherein the temperature sensor is positioned on a distal end of the cannula.

10. The method of claim 1, wherein the temperature sensor is in an inlet opening of the cannula.

11. A computer processing unit configured to perform a method for determining a blood volume flow through a cardiac support system, the method comprising:
    determining, by a temperature sensor, a blood temperature parameter of blood conveyed by a flow machine through a cannula, the temperature sensor located at an inlet of the cannula;
    operating a heating element located downstream of the temperature sensor to change a blood temperature of the blood located in the cannula downstream of the temperature sensor and upstream of the flow machine; and
    determining the blood volume flow based on 1) the blood temperature parameter and 2) a heating element operating parameter.

12. The computer processing unit of claim 11, wherein the temperature sensor is at least 5 mm upstream of the heating element.

13. The computer processing unit of claim 11, wherein the temperature sensor is positioned on a distal end of the cannula.

14. The computer processing unit of claim 11, wherein the temperature sensor is in an inlet opening of the cannula.

15. A cardiac support system, comprising:
    a flow machine configured to convey blood through a cannula;
    a temperature sensor positioned in a region of the cannula located upstream of the flow machine and configured to measure a blood temperature parameter of the blood at an inlet of the cannula; and
    a heating element located downstream of the temperature sensor and upstream of the flow machine and configured to change a temperature of the blood located in the cannula downstream of the temperature sensor.

16. The cardiac support system according to claim 15, further comprising a computer processing unit configured to determine a blood volume flow through the cannula based on 1) the blood temperature parameter and 2) a heating element operating parameter.

17. The cardiac support system according to claim 15 wherein the flow machine is configured for conveying the blood through the cannula, toward the flow machine.

18. The cardiac support system according to claim 17, wherein the blood temperature parameter comprises a temperature of the blood, wherein the temperature sensor is arranged between the heating element and the flow machine, for measuring a temperature of the blood guided toward the flow machine.

19. The cardiac support system according to claim 18, wherein the temperature sensor is arranged on an inner wall of the cannula.

20. The cardiac support system according to claim 15, wherein the cannula is configured for guiding blood from a ventricle of a heart into an aorta.

21. The cardiac support system according to claim 15, wherein the temperature sensor is configured to measure a reference temperature, wherein the temperature sensor is arranged at an end of the cannula facing away from the flow machine.

22. The cardiac support system according to claim 15, wherein the heating element is arranged on an inner wall of the cannula.

23. The cardiac support system according to claim 15, wherein the heating element is arranged inside the cannula in between the temperature sensor and the flow machine.

24. The cardiac support system according to claim 15, wherein the heating element is formed as a heating filament or thermofilament.

25. The cardiac support system according to claim 15, further comprising a second temperature sensor.

26. The cardiac support system according to claim 25, wherein the second temperature sensor is thermally coupled to the heating element.

27. The cardiac support system according to claim 25, wherein the second temperature sensor is arranged between the heating element and the flow machine.

28. The cardiac support system according to claim 15, further comprising:
    a tubular elongated structure with a cannula portion, in which the cannula is formed, and;
    a flow machine portion which is connected to the cannula portion and in which the flow machine is arranged.

29. The cardiac support system of claim 15, wherein the temperature sensor is at least 5 mm upstream of the heating element.

30. The cardiac support system of claim 15, wherein the temperature sensor is positioned on a distal end of the cannula.

* * * * *